US012772960B2

(12) United States Patent
Erickson et al.

(10) Patent No.: US 12,772,960 B2
(45) Date of Patent: Oct. 27, 2026

(54) HATCHLING SUPPORTS, HATCHLING SUPPORT SYSTEMS, AND METHODS

(71) Applicant: NOVA-TECH ENGINEERING, LLC, Willmar, MN (US)

(72) Inventors: Matthew H. Erickson, Spicer, MN (US); Matthew R. Biel, Willmar, MN (US)

(73) Assignee: Nova-Tech Engineering, LLC, Willmar, MN (US)

(*) Notice: Subject to any disclaimer, the term of this patent is extended or adjusted under 35 U.S.C. 154(b) by 862 days.

(21) Appl. No.: 17/792,478

(22) PCT Filed: Jan. 22, 2021

(86) PCT No.: PCT/US2021/014543

§ 371 (c)(1),
(2) Date: Jul. 13, 2022

(87) PCT Pub. No.: WO2021/150842

PCT Pub. Date: Jul. 29, 2021

(65) Prior Publication Data

US 2023/0049744 A1 Feb. 16, 2023

Related U.S. Application Data

(60) Provisional application No. 62/965,269, filed on Jan. 24, 2020.

(51) Int. Cl.
*A01K 37/00* (2006.01)
*A01K 45/00* (2006.01)
(Continued)

(52) U.S. Cl.
CPC ............ *A01K 45/005* (2013.01); *A01K 37/00* (2013.01); *A61D 3/00* (2013.01); *A61D 2003/003* (2013.01); *A61D 7/00* (2013.01)

(58) Field of Classification Search
USPC ................. 119/712, 713, 714, 715, 716, 853
See application file for complete search history.

(56) References Cited

U.S. PATENT DOCUMENTS 1,812,892 A 7/1931 Merrifield
2,051,989 A * 8/1936 Ellis ........................ A01K 37/00 119/714

(Continued)

FOREIGN PATENT DOCUMENTS

CN 107669366 2/2018
CN 304964265 12/2018

(Continued)

OTHER PUBLICATIONS

PSP, Nova-Tech Poultry Services Processor, announced in YouTube on Dec. 22, 2020 [online], [site visited Jan. 23, 2024], available from the internet URL: [illegible] PSP, Nova-Tech—Poultry Services Processor (youtube.com) (year: 2020).

(Continued)

*Primary Examiner* — Andrea M Valenti
(74) *Attorney, Agent, or Firm* — Mueting Raasch Group

(57) ABSTRACT

Hatchling supports, hatchling support systems, and methods of using the same. The hatchling supports and methods of using the same may employ a cradle in combination with a calming band, with the cradle and calming band providing gentle support of a hatchling supported in the hatchling supports. The hatchling support systems and methods of using the same may include a cam with cam sections having different cam radii may provide the ability to gently transition the support and restraint provided to hatchlings during the loading and unloading of hatchlings from hatchling supports. In some cases, compression delivered to hatchlings in hatchling supports having both a cradle and calming band may be adjusted.

34 Claims, 10 Drawing Sheets

(51) Int. Cl.
*A61D 3/00* (2006.01)
*A61D 7/00* (2006.01)

(56) References Cited

U.S. PATENT DOCUMENTS

| | | | | |
|---|---|---|---|---|
| 2,952,031 | A * | 9/1960 | Breitkreutz | A22B 3/086 119/713 |
| 3,286,694 | A | 11/1966 | Landy | |
| 3,774,578 | A | 11/1973 | Randolph | |
| 3,880,122 | A | 4/1975 | Randolph | |
| 4,003,341 | A | 1/1977 | La Croix | |
| 4,120,266 | A | 10/1978 | Oloff | |
| 4,151,812 | A | 5/1979 | Miller | |
| 4,184,451 | A | 1/1980 | Carlin | |
| 4,261,295 | A | 4/1981 | Kanetake | |
| 4,502,418 | A * | 3/1985 | Runyan | A22C 21/0007 452/54 |
| 4,681,565 | A | 7/1987 | Gourlandt | |
| 4,693,212 | A | 9/1987 | Black | |
| 5,195,925 | A | 3/1993 | Gorans | |
| 5,267,778 | A | 12/1993 | Krebs | |
| D371,871 | S | 7/1996 | Allamby | |
| D378,449 | S | 3/1997 | Hunt | |
| 5,651,731 | A | 7/1997 | Gorans | |
| 5,823,146 | A | 10/1998 | Alaniz | |
| 7,066,112 | B2 | 6/2006 | Gorans | |
| 7,146,936 | B2 | 12/2006 | Dazai | |
| 7,232,450 | B2 | 6/2007 | Gorans | |
| 7,363,881 | B2 | 4/2008 | Gorans | |
| D612,110 | S | 3/2010 | Kerns | |
| 8,499,721 | B2 | 8/2013 | Gorans | |
| D697,677 | S | 1/2014 | Ritchey | |
| D749,275 | S | 2/2016 | Perkins | |
| 9,775,695 | B2 | 10/2017 | Erickson | |
| 9,808,328 | B2 | 11/2017 | Gorans | |
| 9,901,432 | B2 * | 2/2018 | Erickson | A01K 37/00 |
| 10,278,797 | B2 | 5/2019 | Goans | |
| 10,350,041 | B2 * | 7/2019 | Samson | A61D 7/00 |
| D970,829 | S | 11/2022 | Hammer | |
| 2004/0143278 | A1 | 7/2004 | Gorans | |
| 2005/0101937 | A1 | 5/2005 | Groans | |
| 2005/0115521 | A1 | 6/2005 | Gorans | |
| 2006/0207519 | A1 | 9/2006 | Gorans | |
| 2007/0079766 | A1 | 4/2007 | Park | |
| 2011/0313409 | A1 | 12/2011 | Erickson | |
| 2012/0012070 | A1 | 1/2012 | Gorans | |
| 2015/0289475 | A1 | 10/2015 | Stevenson | |
| 2017/0265979 | A1 | 9/2017 | Erickson | |
| 2019/0133734 | A1 | 5/2019 | Erickson | |
| 2019/0216586 | A1 | 7/2019 | Gorans | |
| 2021/0282716 | A1 * | 9/2021 | Cramer | A61B 5/055 |
| 2023/0049744 | A1 | 2/2023 | Erickson | |

FOREIGN PATENT DOCUMENTS

| | | | | | |
|---|---|---|---|---|---|
| CN | 305506234 | | | 12/2019 | |
| ES | 2567642 | | | 10/2016 | |
| FR | 2675990 | | * | 11/1992 | A61F 3/00 |
| FR | 2 848 410 | A1 | | 6/2004 | |
| KR | 20210019842 | | * | 2/2021 | A61D 3/00 |
| KR | 102310642 | | * | 10/2021 | A61B 3/00 |
| SU | 1 342 492 | A1 | | 10/1987 | |
| WO | WO 2010/085719 | A3 | | 7/2010 | |
| WO | WO 2018/204572 | | | 11/2018 | |
| WO | WO 2019/236964 | | | 12/2019 | |

OTHER PUBLICATIONS

PCT Search Report and Written Opinion for PCT/US2021/014543 dated Sep. 1, 2021 (20 pages).

* cited by examiner

HATCHLING SUPPORTS, HATCHLING SUPPORT SYSTEMS, AND METHODS

RELATED APPLICATION

The application is a § 371 U.S. National Stage of International Application No. PCT/US2021/014543 filed Jan. 22, 2021, which claims the benefit under 35 U.S.C. § 119 of U.S. Provisional Application Ser. No. 62/965,269, filed Jan. 24, 2020, and titled HATCHLING SUPPORTS, SYSTEMS AND METHODS, which disclosures are incorporated by reference herein in their entireties.

FIELD

Hatchling supports, hatchling support systems, and methods of using the same are described herein.

BACKGROUND

A variety of activities may be performed with hatchlings to reduce the likelihood of injury, improve growth rate, increase comfort, etc. In many instances, hatchlings are manually restrained to perform such activities such as, for example, inoculations, beak and/or claw treatments, etc. Manual restraint of hatchlings may, however, result in injury if the handler is careless and/or inexperienced. Moreover, the efficacy of the actions performed may be adversely affected due to the inherent variability of manually restraining birds. In some instances, handlers themselves may be injured.

SUMMARY

Hatchling supports, hatchling support systems, and methods of using the same are described herein.

The hatchling supports and methods of using the same described herein may, in one or more embodiments, employ a cradle in combination with a calming band, with the cradle and calming band resulting in gentle support of a hatchling supported in the hatchling supports. In particular, the combination of a cradle and calming band may provide a gentle compressive force on the hatchlings between the cradle and the calming band which may, in one or more embodiments, simulate compression experienced by the hatchlings in ovo. As a result, the combination of a cradle and calming band may have a calming effect on hatchlings which may, in turn, reduce their resistance to restraint. That calming effect may reduce the likelihood of injury to the hatchlings as a result of resistance to restraint and may also facilitate delivery of any processes to the hatchlings while in the hatchling supports described herein.

The hatchling support systems and methods of using the same described herein may, in one or more embodiments, be particularly useful when combined with the hatchling supports described herein at retaining hatchlings in the hatchling supports while moving the hatchlings in the hatchling supports between processes. In one or more embodiments, providing a cam with cam sections having different cam radii may provide the ability to gently transition the support and restraint provided to hatchlings during, for example, the loading and unloading of hatchlings from the hatchling supports. Further, in one or more embodiments, the compression delivered to hatchlings in hatchling supports having both a cradle and calming band may be adjusted (using, for example, smaller or larger cam radii) to provide a desired level of compression between the cradle and the calming band that may vary depending on the process being performed on a hatchling.

In a first aspect, one or more embodiments of a hatchling support as described herein may include: a head holder comprising a head cavity configured to receive a head of a hatchling and a keeper apparatus configured to retain a head of a hatchling in the head cavity, the keeper apparatus optionally movable between an open configuration and a closed configuration, wherein the head of a hatchling is retained in the head cavity when the keeper apparatus is in the closed configuration and wherein a head of a hatchling in the head cavity is free to move out of the head cavity when the keeper apparatus is in the open configuration; a cradle operably attached to the head holder, wherein the cradle is movable between a loading configuration and a support configuration, wherein, optionally, the cradle rotates about a cradle axis oriented transverse to a midline of a hatchling having a head retained in the head cavity of the head holder when moving between the loading configuration and the support configuration, wherein the cradle supports a ventral surface of a hatchling having a head retained in the head cavity of the head holder when the cradle is in the support configuration; and a calming band operably attached to the head holder, wherein the calming band is movable between a retracted configuration and an activated configuration, wherein, optionally, the calming band rotates about a band axis oriented transverse to a midline of a hatchling having a head retained in the head cavity of the head holder when moving between the retracted configuration and the activated configuration, wherein the calming band is positioned proximate a dorsal surface of a torso of a hatchling having a head retained in the head cavity of the head holder and a ventral surface supported by the cradle when the cradle is in the support configuration.

In a second aspect, one or more embodiments of a method of supporting a hatchling using one or more embodiments of a hatchling support as described in the first aspect may include: placing a head of a hatchling in the head cavity of the head holder and retaining the head of the hatchling in the head cavity by moving the keeper apparatus to the closed configuration; supporting a ventral surface of the hatchling on the cradle by rotating the cradle to the support configuration from the loading configuration after retaining the head of the hatchling in the head cavity; and positioning the calming band on the dorsal surface of the hatchling by rotating the calming band from the retracted configuration to the activated configuration about the band axis after retaining the head of the hatchling in the head cavity.

In a third aspect, one or more embodiments of a method of supporting a hatchling as described herein may include: restraining a head of a hatchling in a head cavity of a head holder; supporting a ventral surface of the hatchling on a cradle by rotating the cradle into contact with the ventral surface of the hatchling after restraining the head of the hatchling in the head cavity of the head holder; and moving a calming band into contact with the dorsal surface of the hatchling by rotating the calming band into contact with the dorsal surface of the hatchling after restraining the head of the hatchling in the head cavity.

In a fourth aspect, one or more embodiments of a hatchling support system as described herein may include: a support platform mounted on a base for rotation about a platform axis extending through the support platform and the base; a cam comprising a peripheral edge, wherein a rotational position of the cam is, optionally, fixed relative to the platform axis, wherein the peripheral edge of the cam comprises a plurality of cam sections, wherein each cam section of the plurality of cam sections occupies a selected arc of the peripheral edge, and wherein a cam radius between the platform axis and the peripheral edge in each cam section of the plurality of cam sections is different; and a plurality of hatchling supports mounted on a periphery of the support platform, wherein each hatchling support is mounted in a fixed location on the periphery of the support platform, and wherein rotation of the support platform about the platform axis rotates the plurality of hatchling supports about the platform axis and the cam. In one or more embodiments, each hatchling support of the plurality of hatchling supports may include: an open configuration and a closed configuration, wherein the hatchling support is configured to receive a hatchling in the open configuration and retain a hatchling in the closed configuration, and a follower configured to contact the peripheral edge of the cam in one or more cam sections of the plurality of cam sections, wherein the follower is in an open position when the hatchling support is in the open configuration and a closed position when the hatchling support is in the closed configuration, wherein contact between the follower and the peripheral edge of the cam is configured to hold the follower in the closed position in at least one cam section of the plurality of cam sections.

In a fifth aspect, one or more embodiments of a method of supporting and transporting hatchlings as described herein may include: restraining a head of a hatchling in a head cavity of a head holder; supporting a ventral surface of the hatchling on a cradle by rotating the cradle into contact with the ventral surface of the hatchling after restraining the head of the hatchling in the head cavity of the head holder; and moving a calming band into contact with the dorsal surface of the hatchling by rotating the calming band into contact with the dorsal surface of the hatchling after restraining the head of the hatchling in the head cavity, wherein the head holder, the cradle, and the calming band are operably attached to form a hatchling support; and wherein rotating the cradle into contact with the ventral surface of the hatchling comprises rotating the hatchling support about a platform axis to contact the cradle with a first segment of a cam configured to rotate the cradle about a cradle axis as the hatchling support rotates about the platform axis.

If used herein, the term "substantially" has the same meaning as "significantly," and can be understood to modify the term that follows by at least about 75%, at least about 90%, at least about 95%, or at least about 98%. The term "not substantially" as used here has the same meaning as "not significantly," and can be understood to have the inverse meaning of "substantially," i.e., modifying the term that follows by not more than 25%, not more than 10%, not more than 5%, or not more than 2%.

Numeric values used herein include normal variations in measurements as expected by persons skilled in the art and should be understood to have the same meaning as "approximately" and to cover a typical margin of error, such as ±5% of the stated value.

Terms such as "a," "an," and "the" are not intended to refer to only a singular entity but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

Figure 1:
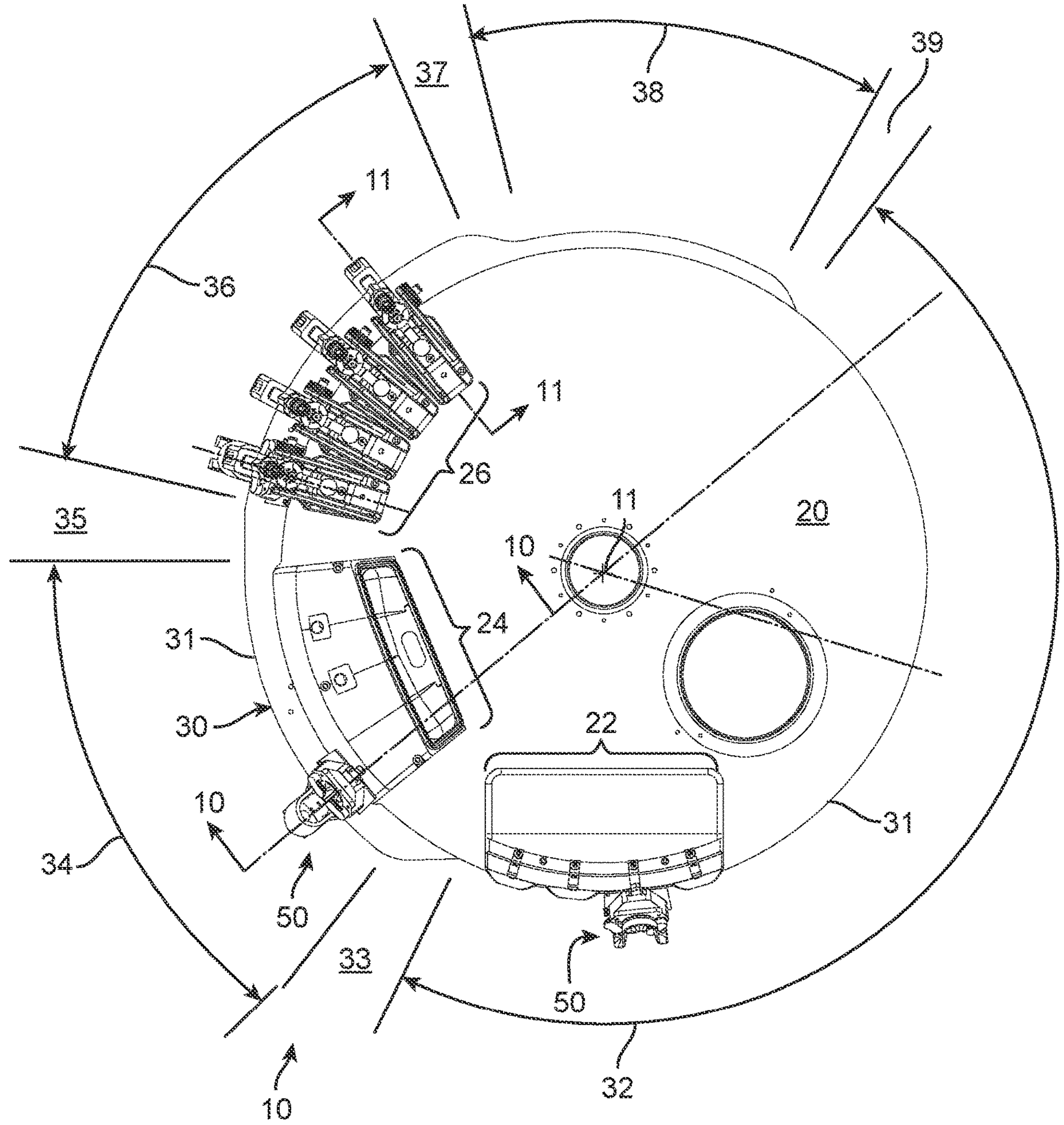
FIG. 1 is a top plan view of one illustrative embodiment of a hatchling support system as described herein.

While the above-identified figures (which may or may not be drawn to scale) set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope of this invention.

DESCRIPTION OF ILLUSTRATIVE EMBODIMENTS

Before any illustrative embodiments are described in detail, it is to be understood that the invention is not limited in its application to the details of construction and the arrangement of components set forth in the following description or illustrated in the figures of the drawing. The invention is capable of other embodiments and of being practiced or of being carried out in various ways.

Illustrative embodiments of a hatchling support system, hatchling supports that may be used in the hatchling support system, and methods of using both the hatchling support system as well as the hatchling supports are described herein. Although the illustrative embodiments of hatchling supports as specifically described herein may be useful in combination with the hatchling support systems described herein, alternative hatchling supports may also be used with the hatchling support systems and methods described herein.

Figure 2:
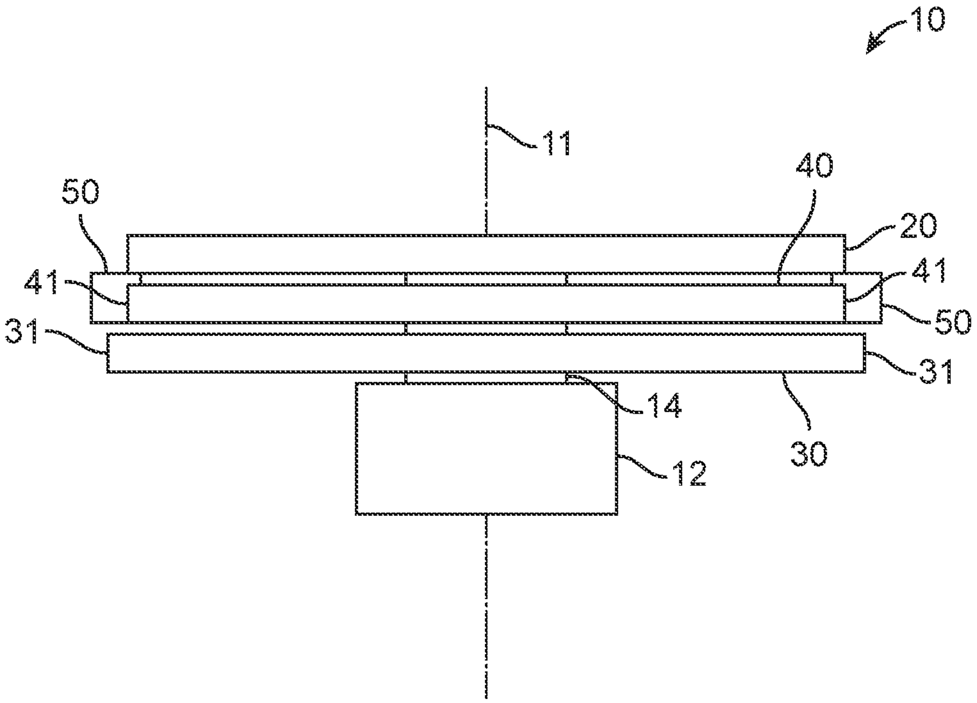
FIG. 2 it is a schematic diagram of a side view of the illustrative embodiment of the hatchling support system depicted in FIG. 1.

With reference to FIGS. 1-2, one illustrative embodiment of a hatchling support system 10 as described herein may include a processing station platform 20, cam 30, support platform 40, and a plurality of hatchling supports 50 mounted on the support platform 40. In particular, it should be understood that the support platform 40 is visible in the schematic diagram of FIG. 2 but is obscured by the processing station platform 20 in the top plan view of FIG. 1.

The processing station platform 20 is, in one or more embodiments, typically fixed relative to the platform axis 11 such that the rotational position of the processing station platform 20 and any processing stations located thereon is also preferably fixed relative to the platform axis 11. In the depicted illustrative embodiment, the processing station platform 20 carries a set of loading stations 22 at which hatchling supports 50 are loaded with hatchlings as described herein.

The processing station platform 20 depicted in FIG. 1 also carries a set of beak treatment stations 24, as well as a set of injection stations 26. In one or more embodiments, it may be preferable, but not required, to match the number of loading stations 22 with the number of beak treatment stations 24 and injection stations 26 (for example, in the depicted embodiment, the processing station platform 20 carries four loading stations 22, four beak treatment stations 24, and four injection stations 26). Although the depicted illustrative embodiment of hatchling support system 10 includes only beak treatment stations and injection stations, other types of processing stations may be used in one or more embodiments of hatchling support systems as described herein in addition to and/or in place of the depicted beak treatment and injection stations. Such alternative processing stations may include, for example, claw treatment stations, sexing or gender identification stations, etc.

Nonlimiting examples of processes and/or processing stations that may be used in one or more embodiments of the hatchling support systems described herein may be described in, for example, U.S. Pat. No. 5,195,925 (METHOD AND APPARATUS FOR DECLAWING POULTRY); U.S. Pat. No. 5,651,731 (METHOD AND APPARATUS FOR DEBEAKING POULTRY); U.S. Pat. No. 7,232,450 (APPARATUS AND METHOD FOR UPPER AND LOWER BEAK TREATMENT); U.S. Pat. No. 8,499,721 (APPARATUS AND METHOD FOR NASAL DELIVERY OF COMPOSITIONS TO BIRDS); U.S. Pat. No. 7,363,881 (BEAK TREATMENT WITH TONGUE PROTECTION); U.S. Pat. No. 9,775,695 (FOURTH TOE PROCESSING SYSTEMS AND METHODS); US Patent Application Publication US 2019/0133734 (POULTRY INJECTION APPARATUS WITH ROTATING CAPTURE MEMBERS AND METHODS OF USE); International Publication WO 2018204572 (INJECTION SYSTEMS AND METHODS); International Publication WO 2019236964 (ENERGY DELIVERY SYSTEM USING AN ELECTRIC FIELD); etc.

The number of processing stations of each type provided on any processing station platform used in a hatchling support system as described herein may vary depending on the timing required for processing hatchlings at each of the processing stations. In one or more embodiments, the number of processing stations provided in different sets of processing stations of a hatchling support system as described herein may be the same. For example, in the depicted illustrative embodiment of hatchling support system 10, the loading stations 22, beak treatment stations 24, and injection stations 26 each include four stations. Sets of four stations in the depicted illustrative embodiment of hatchling support system 10 may be beneficial for systems in which hatchlings are manually loaded into hatchling supports in the loading stations 22. In alternative embodiments of hatchling support systems as described herein, two or more different sets of processing stations may, however, include different numbers of processing stations.

In one or more embodiments, the support platform 40 is mounted on a base 12 using a central support assembly 14, with the support platform 40 being configured for rotation about a platform axis 11 that, in the depicted illustrative embodiment, extends through each of the processing station platform 20 and cam 30. The base 12 may include any suitable drive mechanism (for example, electric motor, hydraulic motor, etc.) that may be used to rotate the support platform 40 about the platform axis 11 as needed to move the hatchling supports 50 through the hatchling support system 10 as described herein.

As described herein, the hatchling supports 50 are, in one or more embodiments, mounted on a periphery 41 of the support platform 40. Each hatchling support 50 is mounted in a fixed location on the periphery 41 of the support platform 40. As a result, rotation of the support platform 40 about the platform axis 11 rotates the hatchling supports 50 about the platform axis 11.

Although only two hatchling supports 50 are depicted in the top plan view of FIG. 1 and the schematic side elevation view of FIG. 2, hatchling support systems as described herein will typically include hatchling supports located about a majority, if not substantially all, of the periphery of the support platforms of the hatchling support systems. The hatchling supports 50 will typically be provided in spacing about the periphery 41 of the support platform 40 that matches the spacing needed to properly locate the hatchlings in hatchling supports 50 at any processing stations (for example, beak treatment stations 24 and/or injection stations 26) provided in the hatchling support systems.

The hatchling support systems described herein also include a cam used to move the hatchling supports between an open configuration and a closed configuration. In the depicted illustrative embodiment of hatchling support system 10, the cam 30 is located below the processing station platform 20 and the support platform 40, with the support platform 40 being located between the processing station platform 20 and the cam 30 along the platform axis 11. The rotational position of the cam 30 may preferably be fixed relative to the platform axis 11. Because the rotational position of the processing station platform 20 is also preferably fixed relative to the platform axis 11, the features on the cam 30 are in fixed positions relative to the processing station platform 20, including any processing stations located on the processing station platform 20. Alternatively, the processing station platform 20 and the cam 30 may be described as being fixed in position relative to each other, with the system configured to rotate the support platform 40 relative to the processing station platform 20 and the cam 30 and/or rotate the processing station platform 20 and cam 30 relative to the support platform. Still further, all of the processing station platform 20, cam 30, and support platform 40 can rotate about platform axis 11 (with the proviso that the relative positions processing station platform 20 and cam 30 remain fixed relative to each other). The cams used in hatchling support systems described herein have a peripheral edge. In the depicted illustrative embodiment of hatchling support system 10, the cam 30 has a peripheral edge 31 that includes a plurality of cam sections. In the depicted embodiment, the cam 30 includes cam sections 32, 34, 36, and 38. Each of the adjacent cam sections is separated by a transition section. In the depicted embodiment, transition section 33 is located between cam sections 32 and 34, transition section 35 is located between cam sections 34 and 36, transition section 37 is located between cam sections 36 and 38, and transition section 39 is located between cam sections 38 and 32.

Each of the cam sections 32, 34, 36, and 38 occupies a selected arc of the peripheral edge 31 of the cam 30. The size of the selected arcs of each of the cam sections may be selected relative to the distance required/space needed for any processing stations or other activities performed using the hatchling support systems described herein. In general, however, the cam sections may be described as occupying arcs that total 360° (including the transition sections), with each cam section occupying a portion of the total 360° defined by the peripheral edge 31 of the cam 30.

The cam radius of each of the cam sections 32, 34, 36, and 38 is measured along a radius from the platform axis 11 to the peripheral edge 31 in each of the cam sections. The cam sections may each have a different cam radius, although cam sections that are not adjacent each other may have the same cam radius. In general, at least two of the cam sections of a cam used in a hatchling support system as described herein will have different cam radii.

The transition sections located between adjacent cam sections 32, 34, 36, and 38 are provided to transition the peripheral edge 31 of the cam 30 from the cam radius in one cam section to the cam radius in the adjacent cam section. For example, transition section 33 transitions the cam radius of the peripheral edge 31 from the cam radius provided in cam section 32 to the larger cam radius provided in cam section 34. Similarly, transition section 35 transitions the cam radius of the peripheral edge 31 from the cam radius provided in cam section 34 to the slightly larger cam radius provided in cam section 36. Transition section 37 transitions the cam radius of the peripheral edge 31 from the cam radius provided in cam section 36 to the smaller cam radius provided in cam section 38. Finally, transition section 39 transitions the cam radius of the peripheral edge 31 from the cam radius provided in cam section 38 to the smaller cam radius provided in cam section 32.

Although the transition sections 33, 35, 37, and 39 are depicted as changing in a relatively smooth or gradual manner, transition sections used between cam sections in one or more embodiments of cams used in hatchling support systems as described herein may, alternatively, be abrupt. Particularly, in the case of a transition to a smaller cam radius, the transition to the smaller cam radius may be, for example, instantaneous, in such cases, there is essentially no transition section with an abrupt change from a larger cam radius to a smaller cam radius.

Although not required, the cam radius of each of the cam sections 32, 34, 36, and 38 may preferably be constant within the cam section. Holding the cam radius constant within a cam section will typically provide for consistent/uniform retention of a hatchling in a hatchling support 50 passing through that cam section.

Figure 3:
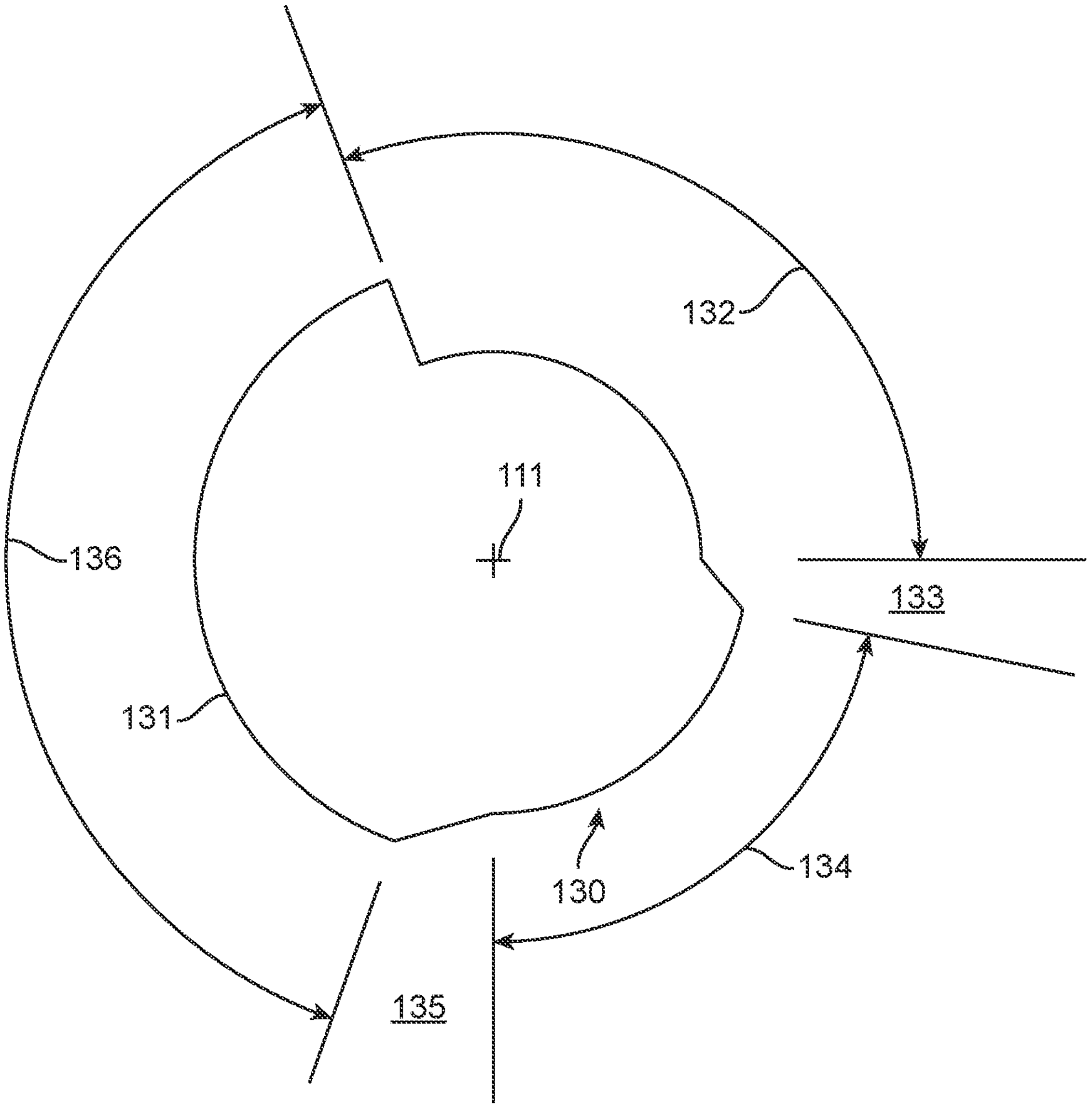
FIG. 3 is a schematic diagram of one illustrative embodiment of a cam that may be used in one or more embodiments of a hatchling support system as described herein.

Although the depicted illustrative embodiment of cam 30 used in hatchling support system 10 includes four different cam sections, one or more alternative embodiments of cams used in hatchling support systems as described herein may include any number of cam sections including as few as two cam sections, three cam sections, and five or more cam sections. One alternative embodiment of a cam is depicted schematically in FIG. 3 with the cam 130 having a peripheral edge with three cam sections 132, 134, and 136. The cam sections define cam radii from a platform axis 111. The cam 130 includes transition section 133 between cam sections 132 and 134 and transition section 135 between cam sections 134 and 136. The transition between cam sections 136 and 132 is provided as an example of an abrupt or instantaneous change in cam radius from the larger cam radius of cam section 136 to the smaller cam radius of 132.

In a cam including an abrupt or instantaneous change in cam radius, the rotational direction of the cam may be limited such that the rotation of the cam does not interfere or prevent a follower from moving between the cam sections. In cam 130, for example, rotation of a support platform 140 about the platform axis 111 may preferably be limited to clockwise rotation, such that any follower on the hatchling supports moving around the cam 130 do not move from the smaller cam radius of cam section 132 to the larger cam radius 136 but are, instead, limited to moving from the larger cam radius 136 to the smaller cam radius 132.

The hatchling support systems described herein also include a plurality of hatchling supports mounted on a periphery of a support platform. In the depicted illustrative embodiment, hatchling supports 50 are mounted on the periphery 41 of support platform 40. Rotation of the support platform 40 about the platform axis 11 rotates the hatchling supports 50 about the platform axis 11 as well as the cam 30.

In one or more embodiments, each of the hatchling supports may be described as having an open configuration and a closed configuration. The hatchling supports 50 are configured to receive a hatchling when in their open configuration and configured to retain a hatchling in the hatchling support when the hatchling support is in the closed configuration.

Each of the hatchling supports 50 includes a follower that is configured to contact the peripheral edge 31 of the cam 30 in one or more of the cam sections of cam 30. Contact between the followers of the hatchling supports 50 and the peripheral edge 31 of the cam 30 is configured to hold the followers of the hatchling supports in a closed position in at least one cam section of the cam sections provided on cam 30. In particular, the followers of hatchling supports 50 may be in a closed position (with the hatchling support 50 being in a closed configuration) when the followers are contacting the peripheral edge 31 of the cam 30 in cam sections 34 and 36.

The followers on hatchling supports 50 may, however, not actually contact the peripheral edge 31 of the cam 30 in every cam section of a cam provided in a hatchling support system as described herein. For example, the followers of hatchling supports 50 may not contact the peripheral edge 31 of the cam 30 in cam section 32.

The followers of hatchling supports 50 may be described as being in an open position when the hatchling support is in its open configuration, with the follower being described as being in a closed position when the hatchling support is in a closed configuration. The followers of hatchling supports 50 may be in more than one location relative to the hatchling support and still be in a closed configuration as described herein. Moreover, the followers of hatchling supports 50 may be in more than one location relative to the hatchling support 50 and still be in an open configuration as described herein. For example, the followers of hatchling supports 50 may contact the peripheral edge 31 of cam 30 in cam section 38 even though the follower of hatchling support 50 may be considered to be in an open position with the hatchling support being in an open configuration when traveling through cam section 38. These features will be described in more detail below with respect to one illustrative embodiment of a hatchling support that may be used in the hatchling support systems described herein.

Figure 5:
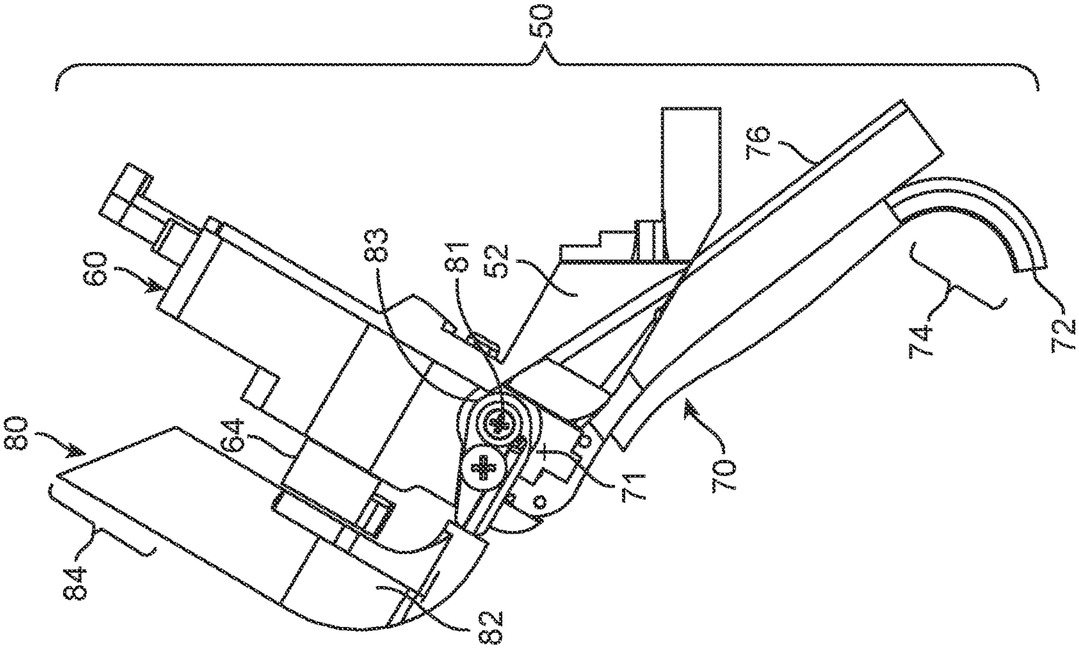
FIG. 5 is a right side elevation view of the illustrative embodiment of the hatchling support as depicted in FIG. 4.
Figure 4:
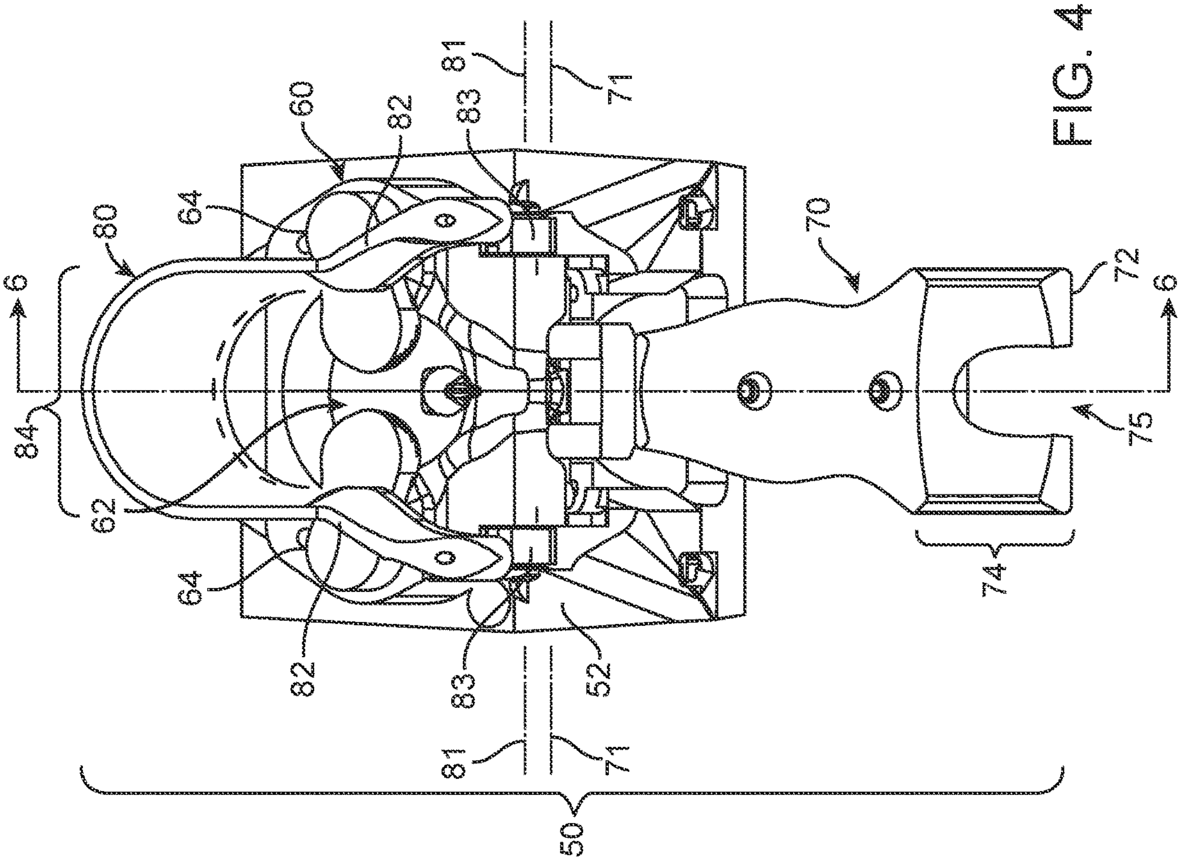
FIG. 4 is a front elevation view of one illustrative embodiment of a hatchling support as described herein.
Figure 6:
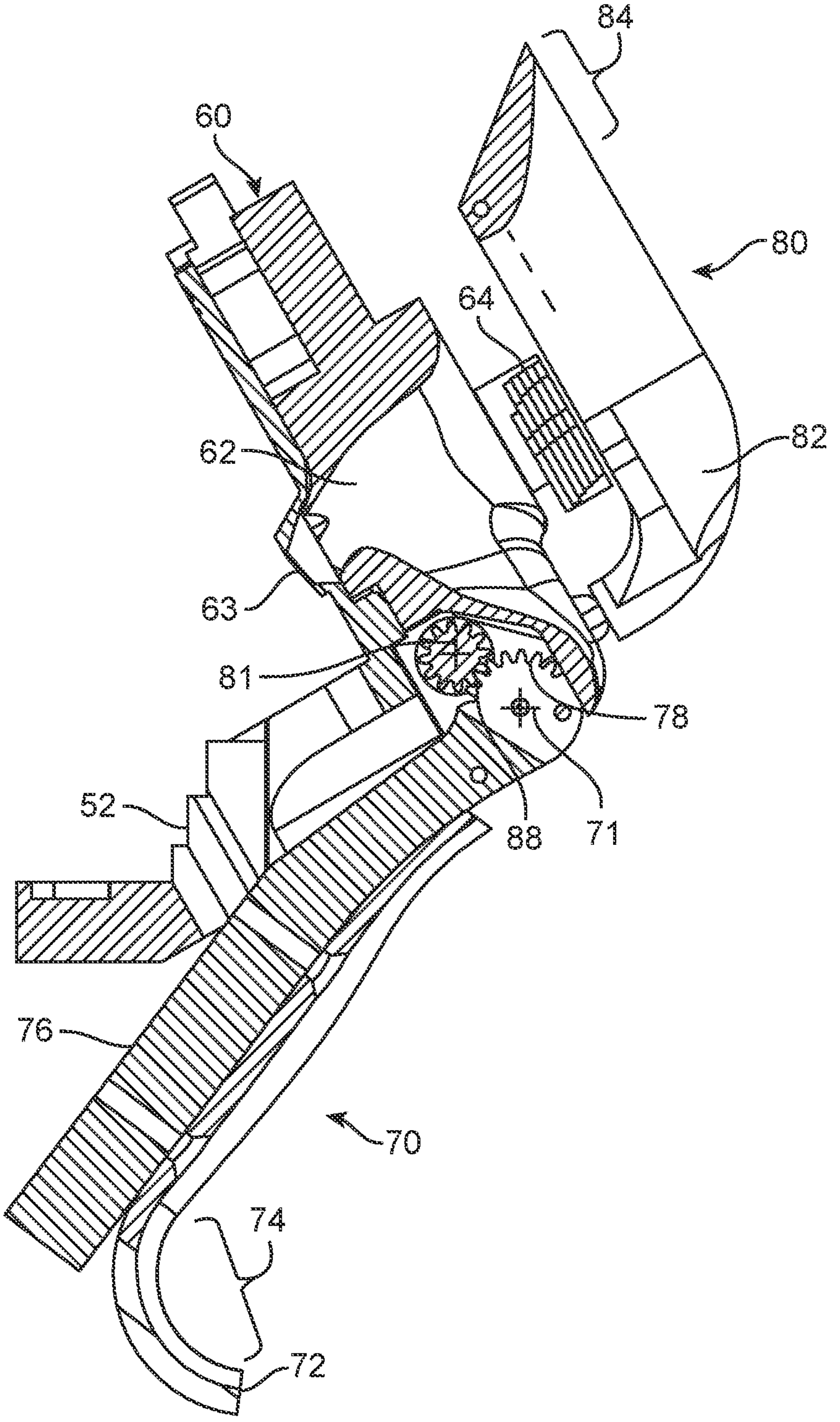
FIG. 6 is a cross-sectional view of the hatchling support as depicted in FIG. 4 taken along line 6-6 in FIG. 4.
Figure 8:
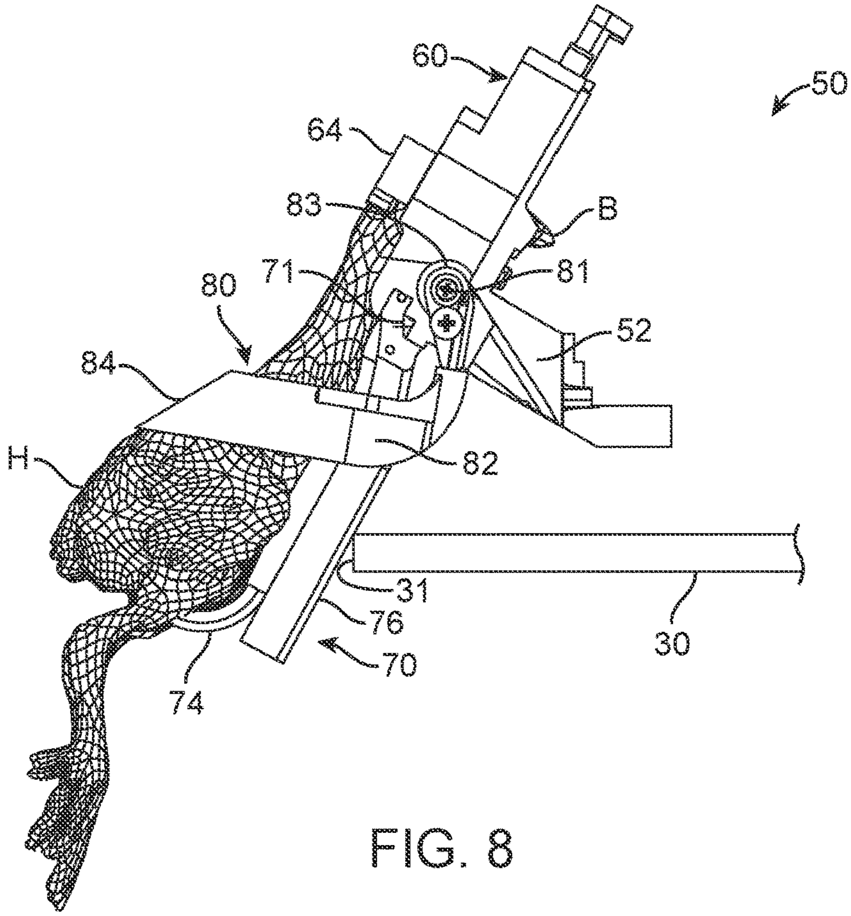
FIG. 8 is a side elevation view of the hatchling support depicted in FIG. 4, with the hatchling support being in a closed configuration with a hatchling H located in the hatchling support.
Figure 9:
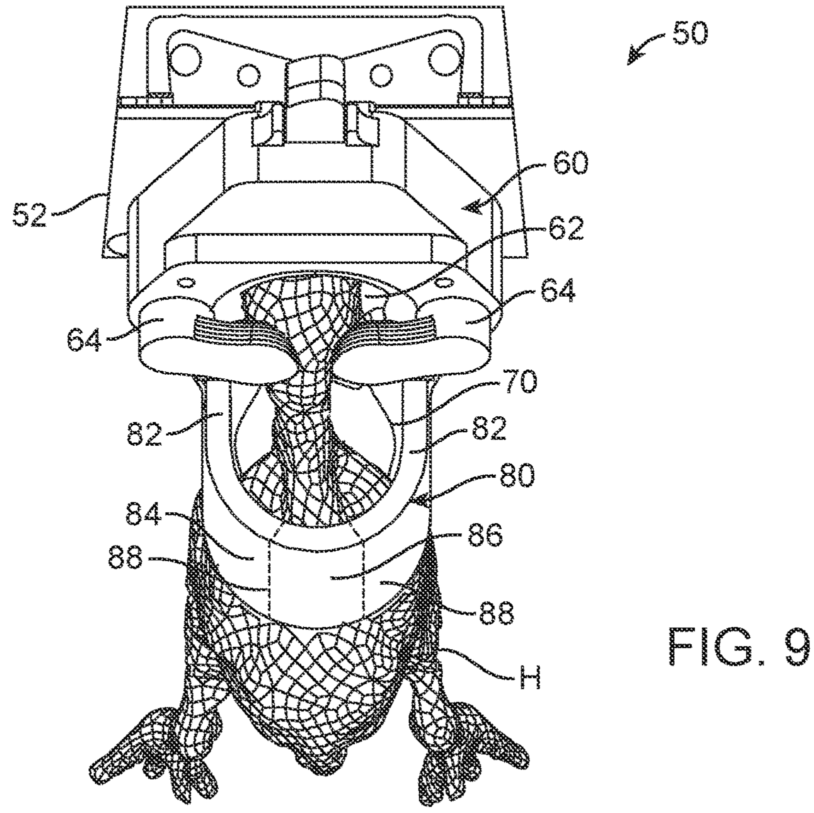
FIG. 9 is a top view of the hatchling support as depicted in FIG. 8.

One illustrative embodiment of a hatchling support that may be used in one or more embodiments of hatchling support systems as described herein is depicted in FIGS. 4-6, with FIG. 5 being a right side view of the hatchling support 50 as seen in FIG. 4 and FIG. 6 being a cross-sectional view of the hatchling support 50 taken along line 6-6 in FIG. 4. That illustrative embodiment of a hatchling support 50 is also depicted in FIGS. 8-9 with a hatchling H located in the hatchling support 50.

The depicted illustrative embodiment of hatchling support 50 includes a head holder 60, cradle 70 and calming band 80 attached to a base 52 used to attach the hatchling support 50 to a support platform of a hatchling support system as described herein.

The depicted illustrative embodiment of head holder 60 includes a head cavity 62 that is configured to receive the head of a hatchling. The head holder 60 also includes a keeper apparatus that is configured to keep or retain the head of a hatchling in the head cavity 62 when the keeper apparatus is in a closed configuration. When the keeper apparatus is in the open configuration, the head of a hatchling in the head cavity 62 is free to move into or out of the head cavity 62 without any functionally significant restriction from the keeper apparatus.

In the depicted illustrative embodiment, the keeper apparatus is in the form of arms 64, with the arms 64 rotating between an open configuration in which access to the head cavity 62 is not obstructed by the arms 64 (and the head of a hatchling located in the head cavity 62 is free to move out of the head cavity 62) and a closed configuration in which the arms at least partially extend over the head cavity 62 to retain the head of a hatchling in the head cavity 62 (and access to the head cavity 62 is at least partially impeded by the arms 64).

Figure 7:
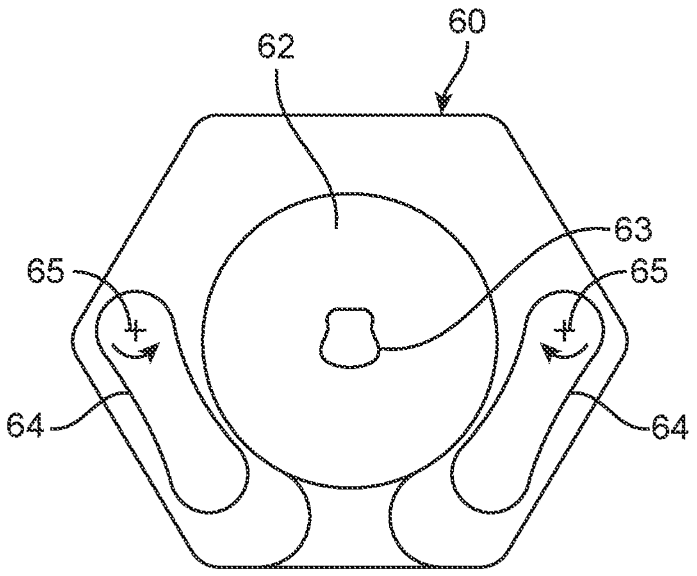
FIG. 7 is an enlarged view of one illustrative embodiment of a head holder including a keeper apparatus that may be used in one or more embodiments of a hatchling support as described herein.

The arms 64 of the depicted illustrative embodiment of hatchling support 50 are in the closed configuration in FIG. 4 (as well as FIG. 9 with a hatchling H located in the hatchling support 50), while the arms 64 are in the open configuration in FIG. 7 (which depicts the head holder 60 separately from the hatchling support 50 for the purpose of improved clarity). With reference to FIG. 7, the arms of the depicted illustrative embodiment of the keeper apparatus are configured to rotate about axes 65 when moving between the open and close configurations as discussed herein. Similar head holders may be described in one or more of U.S. Pat. No. 5,651,731 (METHOD AND APPARATUS FOR DEBEAKING POULTRY); U.S. Pat. No. 7,232,450 (APPARATUS AND METHOD FOR UPPER AND LOWER BEAK TREATMENT); U.S. Pat. No. 7,363,881 (BEAK TREATMENT WITH TONGUE PROTECTION); etc.

Although one illustrative embodiment of a keeper apparatus used in connection with a head holder of hatchling supports described herein may be in the form of a pair of rotating arms, any suitable structure capable of performing the functions of a keeper apparatus for a hatchling support as described herein may be used in place of a pair of rotating arms. One example of a potentially suitable option for a keeper apparatus used with a head holder of a hatchling support as described herein may include the keeper apparatus (ref no. 64) described in U.S. Pat. No. 9,808,328 (POULTRY CARRIERS AND METHODS OF RESTRAINING POULTRY). Other examples of suitable structures for keeper apparatus are also possible.

With reference to FIG. 7, another optional feature that may be provided in connection with the illustrative embodiment of head holder 60 is a beak opening 63 located within the head cavity 62 such that the beak of a bird having its head located in head cavity 62 may extend out of the head cavity 62 on a side of the head holder 60 opposite the side on which the head cavity opens—see, for example, beak B in FIG. 8. Nonlimiting examples of such beak openings and their use in beak treatment processes are described in, for example, U.S. Pat. No. 5,651,731 (METHOD AND APPARATUS FOR DEBEAKING POULTRY); U.S. Pat. No. 7,232,450 (APPARATUS AND METHOD FOR UPPER AND LOWER BEAK TREATMENT); U.S. Pat. No. 7,363,881 (BEAK TREATMENT WITH TONGUE PROTECTION); U.S. Pat. No. 9,808,328 (POULTRY CARRIERS AND METHODS OF RESTRAINING POULTRY); etc.

With reference to FIGS. 4-6, the depicted illustrative embodiment of hatchling support 50 includes a cradle 70. The cradle 70 is operably attached to the head holder 60 and/or base 52 used to attach the hatchling support 50 to a support platform of a hatchling support system as described herein. Regardless of whether the cradle 70 is attached directly to the head holder 60 or to the base 52, the cradle 70 is operably attached to the head holder 60 because the base 52 is attached to the head holder 60 when the base 52 is provided as a separate article from the head holder 60. When the base 52 is an integral part of the head holder 60, the cradle 70 is operably attached (that is, directly attached) to the head holder 60.

The cradle 70 is movable between a loading configuration and a support configuration. In the depicted illustrative embodiment, the cradle 70 rotates about a cradle axis 71 when moving between the loading configuration and a support configuration in which the cradle 70 contacts the ventral surface of a hatchling having its head positioned in the head cavity 62 of head holder 60 and retained therein. The cradle axis 71 may, in one or more embodiments, be described as being transverse to a midline of a hatchling having its head retained in the head cavity 62 of the head holder 60, where the midline of the hatchling is coextensive with cross-section line 6-6 as seen in FIG. 4.

The body of a hatchling supported in the hatchling support 50 with its head retained in the head cavity 62 of the head holder 60 extends downward towards the cradle 70 such that the torso of the hatchling can be supported by the cradle 70 as the cradle 70 moves into its support configuration during rotation of the cradle 70 about cradle axis 71. As used herein, the "torso" of a hatchling is the portion of the hatchling, other than the head, neck, wings and legs, containing the major organs (heart, liver, lungs, kidney, intestines, etc.) as well as the breast of the hatchling. As a result, the cradle 70 supports a ventral surface of a hatchling having its head retained in the head cavity 62 of the head holder 60 when the cradle 70 is in its support configuration (as discussed in connection with, for example, FIGS. 8-9 below).

The depicted illustrative embodiment of cradle 70 extends from a cranial end proximate the cradle axis 71 to a seat end 72 distal from the cradle axis 71. In one or more embodiments, the seat end 72 of the cradle 70 may preferably be sized or configured to fit between the legs of a hatchling having its ventral surface supported by the cradle 70 when the cradle 70 is in its support configuration as described herein.

In one or more embodiments, the seat end 72 of the cradle 70 may include a cupped segment 74 that is configured to extend between the legs of a hatchling having its ventral surface supported by the cradle 70 when the cradle 70 is in its support configuration as described herein. Support of a hatchling H by a cupped segment 74 extending between the legs of a hatchling of the illustrative embodiment of cradle 70 is seen in, for example, FIG. 8.

Another optional feature that may be found in one or more embodiments of hatchling supports as described herein as depicted in connection with FIG. 4 is a forked configuration of the cupped segment 74 in which the cradle includes a vent slot 75 that extends towards the cranial end of the cradle 70 (that is, the cradle axis 71). The vent slot 75 may be provided to provide access to the vent of a hatchling supported by the cradle 70 of the illustrative embodiment of hatchling support 50 as described herein. In addition, the vent slot 75 may also reduce or and prevent accumulation of waste products (for example, feces, urine, etc.) expelled by a hatchling through its vent. In the absence of a cupped segment 74, one or more embodiments of cradles used in connection with hatchling supports as described herein may also include a vent slot.

The depicted illustrative embodiment of a hatchling support 50 also includes a calming band 80 operably attached to the head holder 60. As discussed above the cradle 70 is also operably attached to the head holder 60 which may involve attachment directly to the head holder 60 and/or to a base 52 used to attach the hatchling support 50 to a support platform of a hatchling support system as described herein.

The calming band 80 may, in one or more embodiments, be movable between a retracted configuration and an activated configuration. As seen in FIGS. 4-6, the calming band 80 is in its retracted configuration in contrast to FIGS. 8-9 in which the calming band 80 of hatchling support 50 is depicted in its activated configuration. In the depicted illustrative embodiment, calming band 80 rotates about a band axis 81 when moving between the retracted configuration and the activated configuration. The band axis 81 may, in one or more embodiments, also be oriented transverse to a midline of a hatchling H having its head retained in the head cavity 62 of the head holder 60 of hatchling support 50. Alternatively, the band axis 81 may be described as being aligned with the cradle axis 71.

The calming band may, in one or more embodiments, be positioned proximate a dorsal surface of a torso of a hatchling H having its head retained in the head cavity 62 of the head holder 60 and its ventral surface supported by the cradle 70 when the cradle 70 is in its support configuration as described herein. In one or more embodiments, it may be preferred that the calming band contact the dorsal surface of the hatchling H to provide a calming effect as discussed herein.

In one or more embodiments, the calming band may be described as including a left arm 82 and a right arm 82, with the left and right arms 82 being located on opposite sides of a midline of a hatchling supported in the hatchling support 50 as described herein. In one or more embodiments, each of the left and right arms 82 may include a base end 83 through which the band axis 81 extends.

In one or more embodiments, the calming band 80 may also be described as including a dorsal surface segment 84 extending between the left and right arms 82. In one or more embodiments, the dorsal surface segment 84 may connect the left and right arms 82 proximate a dorsal surface of a hatchling located in the hatchling support 50. In such embodiments, the dorsal surface segment 84 may be described as a continuous dorsal surface segment extending continuously between the left and right arms 82 of the calming band 80.

With reference to FIG. 9, one or more alternative embodiments of a calming band 80 may include an opening or slot 86 between the left and right arms 82 such that the left and right arms 80 to terminate at ends 88 (depicted in broken lines in FIG. 9). In another alternative embodiment, a calming band as used in one or more hatchling supports described herein may include only one arm and a dorsal surface segment.

In one or more embodiments of hatchling supports as described herein, the dorsal surface segment 84 of a calming band 80 may be described as having a top edge proximate the head cavity 62 of the head holder and a bottom edge distal from the head cavity 62 when the calming band 80 is in its activated configuration (as seen in, for example, FIG. 9). The dorsal surface segment 84 may have a height measured between its top and bottom edges along a midline of a hatchling H supported in the hatchling support as described herein.

In one or more embodiments, the height of the dorsal surface segment 84 may be 1 centimeter or more at a lower end and 3 centimeters or less at an upper end. The actual height of the dorsal surface segment 84 may however vary depending on the species or breed of the hatchling, the size of the hatchling, etc. Given the relevant factors, the height of the dorsal surface segment may preferably be selected to contact the dorsal surface of a hatchling H over a distance sufficient to provide a calming effect while still providing access as needed to the dorsal surface of the hatchling for processing in one or more of the processing stations of a hatchling support system in which the hatchling support is used.

Although described in terms of left and right arms 82 and dorsal surface segment 84, the calming bands used in one or more embodiments of a hatchling support as described herein may alternatively be described as a hoop extending between a left end and a right end, with the band axis 81 extending through the left and right ends of the hoop of the calming band 80. When described in such a manner, the hoop having top and bottom edges as discussed above in connection with the dorsal surface segment 84 and a corresponding height between those top and bottom edges as also described above.

As described herein, the cradle 70 rotates between a loading configuration and a support configuration about the cradle axis 71 and calming band 80 rotates between a retracted configuration and an activated configuration about band axis 81. The cradle 70 is depicted in a loading configuration in each of FIGS. 4-6, with the calming band 80 being located in its retracted configuration in FIGS. 4-6. The cradle 70 is depicted in a support configuration in FIGS. 8-9, with the calming band 80 depicted in its activated configuration in FIGS. 8-9. Rotation of the cradle 70 and the calming band 80 about their respective axes occurs relative to the head holder 60 which can be seen by comparing the relative positions of the cradle 70 and calming band 80 in FIGS. 4-6 with the positions of the cradle 70 and calming band 80 in FIGS. 8-9.

Movement of the cradle 70 from its loading configuration to its support configuration may occur at the same time as the calming band 80 moves from its retracted configuration to its activated configuration. In one or more embodiments, movement of the cradle 70 from its loading configuration to its support configuration may cause the calming band 80 to move from its retracted configuration to its activated configuration or vice versa (movement of the calming band 80 may cause movement of the cradle 70).

With reference to the cross-sectional view of FIG. 6 in which one illustrative embodiment of a rotational connection between a cradle and a calming band is depicted, the cradle 70 may include a cradle gear 78 while the calming band 80 may include a band gear 88, with the cradle gear 78 and band gear 88 interacting or meshing with each other such that rotation of the cradle gear 78 about cradle axis 71 causes band gear 88 to rotate about band axis 81 or vice versa.

When used in a hatchling support system as described herein, the cradles of the illustrative embodiments of hatchling supports as described herein may function as the followers that are configured to contact the peripheral edge of a cam of the hatchling support system, with the open position of the follower in the hatchling support systems corresponding to the loading configuration of the cradles of the hatchling supports as described herein and the closed position of the follower in the hatchling support systems corresponding to the support configuration of the cradles of the hatchling supports as described herein. With reference to the hatchling supports depicted in FIGS. 8-9, the cradle/follower 70 is in its loading configuration/open position in FIGS. 4-6 and the cradle/follower 70 is in its support configuration/closed position in FIGS. 8-9.

Although the cradle 70 of the depicted illustrative embodiment of hatchling support 50 functions as the follower in a hatchling support systems as described herein, one or more alternative embodiments of hatchling supports and hatchling support systems as described herein may be configured to use the calming band 80 as a follower, with the calming band 80 being acted on by a cam of a hatchling support system as described herein to move the calming band between its retracted configuration (corresponding to an open position for the follower of the hatchling support systems as described herein) and its activated configuration (corresponding to a closed position for the follower of the hatchling support systems as described herein).

In one or more embodiments of the hatchling supports as described herein, the follower (for example, the cradle 70) may be biased to move to its open position/loading configuration in the absence of a force applied to rotate the cradle 70 about the cradle axis 71. The biasing force may be provided by any number of structures or mechanisms including, but not limited to, torsion springs, coil springs, elastomeric structures, etc. The biasing force may assist in driving the follower (for example, the cradle 70) into contact with the peripheral edges of the cams of one or more embodiments of hatchling support systems as described herein.

Figure 10:
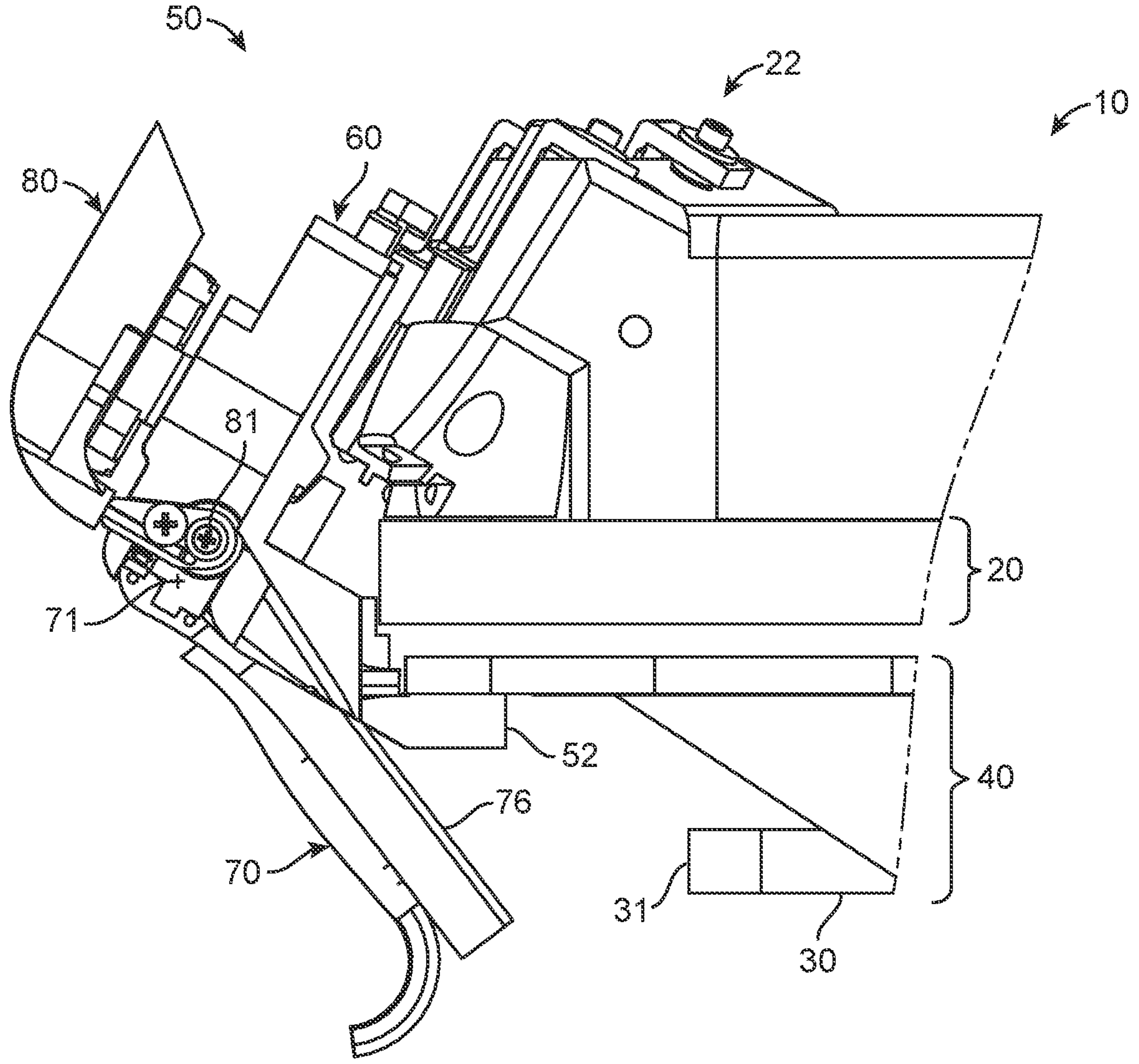
FIG. 10 is a cross-sectional view of a hatchling support positioned at a loading station in the hatchling support system depicted in FIG. 1 taken along a radial line extending from the platform axis in FIG. 1.
Figure 11:
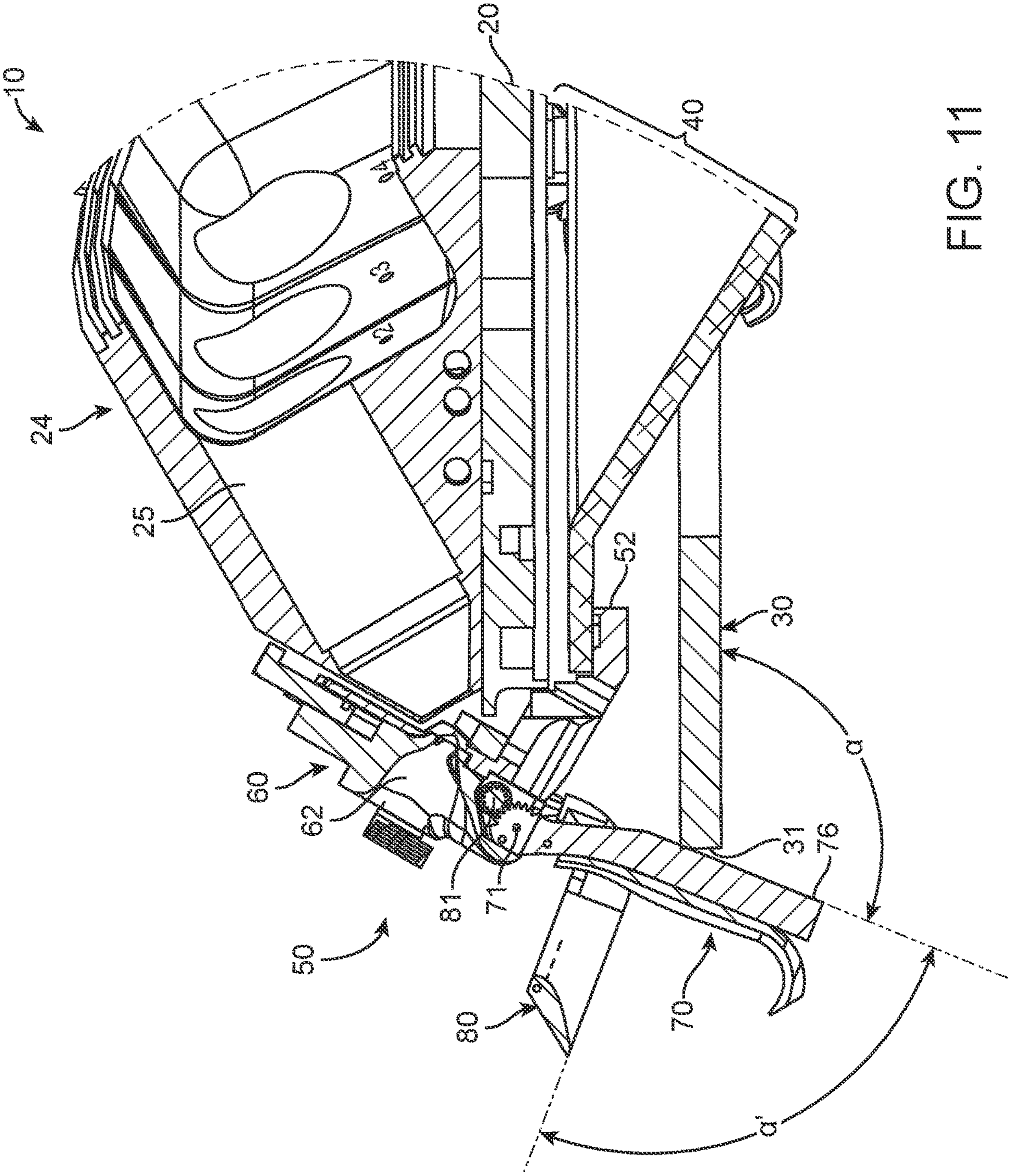
FIG. 11 is a cross-sectional view of a hatchling support positioned at a beak processing station in the hatchling support system depicted in FIG. 1 taken along a radial line extending from the platform axis in FIG. 1.
Figure 12:
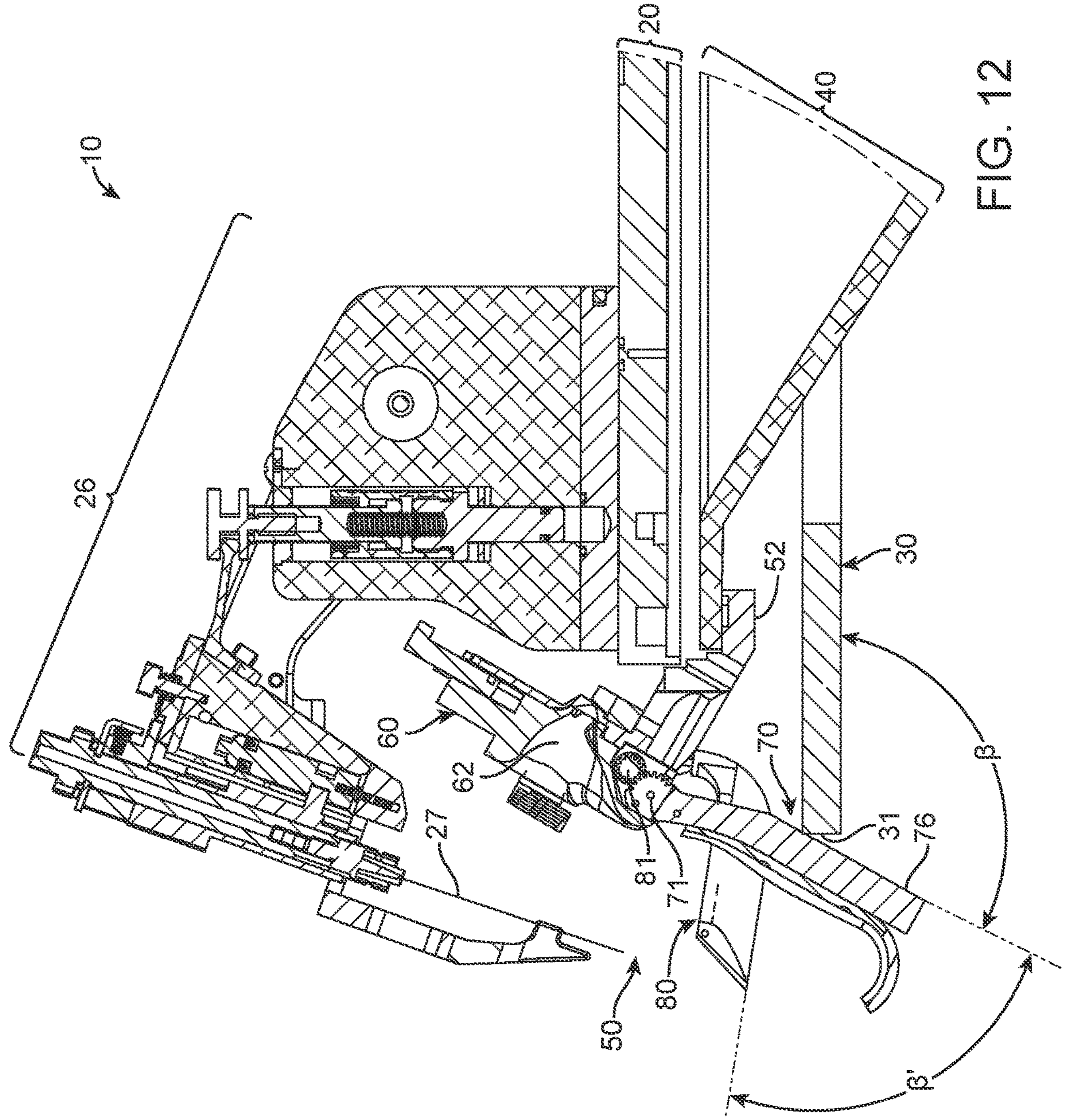
FIG. 12 is a cross-sectional view of a hatchling support positioned at an injection station in the hatchling support system depicted in FIG. 1 taken along a radial line extending from the platform axis in FIG. 1.

Interactions between the illustrative embodiments of hatchling supports 50 and the illustrative embodiment of a hatchling support system as described herein can be discussed with reference to FIGS. 10-12. As seen in FIGS. 10-12, a hatchling support 50 is located on a support platform 40 for rotation about a processing station platform 20 as well as a cam 30 as discussed above with respect to the illustrative embodiments of hatchling support systems described herein. Rotation of the support platform 40 and its attached hatchling support 50 is used to bring the hatchling support 50 into position relative to the stations located on processing station platform 20 as described herein.

In FIG. 10, station 22 is in the form of a loading station at which the heads of hatchlings are positioned in the head cavities in head holders 60 of hatchling supports 50.

In FIG. 11, station 24 is in the form of a beak treatment station in which the beak of a hatchling having its head positioned in head cavity 62 of head holder 60 can be treated using energy directed at the beak through cavity 25 in beak treatment station 24. Beak treatment station 24 may take a variety of forms and some examples of beak treatment stations that may be used in connection with the hatchling support systems described herein may be found in, for example, U.S. Pat. No. 5,651,731 (METHOD AND APPARATUS FOR DEBEAKING POULTRY); U.S. Pat. No. 7,232,450 (APPARATUS AND METHOD FOR UPPER AND LOWER BEAK TREATMENT); U.S. Pat. No. 7,363,881 (BEAK TREATMENT WITH TONGUE PROTECTION); etc.

In FIG. 12, station 26 is in the form of an injection station in which a selected composition may be delivered to a hatchling located in the hatchling support 50 using, for example, injection needle 27. Injection station 26 may take a variety of forms and some examples of injection stations that may be used in connection with the hatchling support systems described herein may be found in, for example, US Patent Application Publication US 2019/0133734 (POULTRY INJECTION APPARATUS WITH ROTATING CAPTURE MEMBERS AND METHODS OF USE); International Publication WO 2018204572 (INJECTION SYSTEMS AND METHODS); etc.

The hatchling support 50 is in its open configuration in FIG. 10 to allow for loading of a hatchling into the hatchling support 50. In particular, the cradle 70 is in its loading configuration and the calming band 80 in its retracted configuration such that the head of a hatchling can be positioned in the head cavity of the head holder 60 as described herein. As seen in FIG. 10, the peripheral edge 31 of cam 30 is not in contact with the follower surface 76 on cradle 70 in the depicted embodiment in which the hatchling support 50 is in its open configuration. With respect to FIG. 1, the cross-sectional view of FIG. 10 may be taken along a radial line extending through platform axis 11 in cam section 32.

In FIG. 11, the hatchling support 50 is in a closed configuration, with the cradle 70 moved to its support configuration and calming band 80 moved to its activated configuration such that a hatchling positioned in the hatchling support 50 is supported within the hatchling support 50. More particularly, cradle 70 supports the ventral surface of the hatchling while calming band 80 wraps around the dorsal surface of the torso of the hatchling as seen in, for example, FIGS. 8-9. Movement of the cradle 70 to its support configuration is, in the depicted embodiment, caused by contact between the peripheral edge 31 of the cam 30 and the follower surface 76 of cradle 70.

Comparing FIG. 11 to FIG. 10, it can be seen that the cradle 70 is rotated outward from the cam 30 about its cradle axis 71 as a result of contact between the peripheral edge 31 of the cam 30 and the follower surface 76 of cradle 70. In the depicted embodiment of hatchling support 50 rotation of the cradle 70 about cradle axis 71 as a result of contact between the peripheral edge 31 of the cam 30 and the follower surface 76 of the cradle 70 causes the calming band 80 to rotate about band axis 81 as described herein.

The hatchling support 50 as depicted in FIG. 12 relative to the injection station 26 is also in a closed configuration in which the cradle is in its support configuration and the calming band 80 is in its activated configuration such that a hatchling positioned in the hatchling support 50 is supported within the hatchling support 50.

While peripheral edge 31 of cam 30 rotates the cradle 70 into contact with the ventral surface of a hatchling having its head located in the head cavity 62 of head holder 60 such that the cradle 70 is in its support configuration as described herein in both FIGS. 11 and 12, the cam radius (that is, the distance between the peripheral edge 31 of cam 30 and the axis about which support platform 40 carrying hatchling support 50 rotates) is greater in the portion of the cam depicted in FIG. 12 as compared to the portion of the cam depicted in FIG. 11.

With respect to FIG. 1, the cross-sectional view of FIG. 11 may be taken along a radial line extending through platform axis 11 in cam section 34, while the cross-sectional view of FIG. 12 may be taken along a radial line extending through platform axis 11 in cam section 36.

One manner in which that difference can be characterized (in addition to the different cam radii) is through the angles formed between the cam 30 and the cradle 70. In particular, angle α (alpha) as depicted in FIG. 11 will be smaller than angle β (beta) in FIG. 12. Because rotation of the cradle 70 in the hatchling supports 50 described herein causes corresponding (but opposite direction) rotation of the calming band 80 about band axis 81, angle α' (alpha') formed between the cradle 70 and the calming band 80 as seen in FIG. 11 will be larger than angle β' (beta') formed between the cradle 70 and calming band 80 as seen in FIG. 12 even though angle α (alpha) as seen in FIG. 11 is smaller than angle β (beta) as seen in FIG. 12.

That inverse relationship (in other words, the decrease in angle β' (beta') as angle β (beta) increases is a result of the opposite directions of rotation of the cradle 70 and calming band 80 about their respective axes. In other words, further rotation of cradle 70 in a clockwise direction about its cradle axis 71 as a result of the increasing cam radius of cam 30 causes further rotation of calming band 80 in a counter-clockwise direction relative to its band axis 81.

The decrease in angle β' (beta') as seen in FIG. 12 as compared to angle α' (alpha') as seen in FIG. 11 is caused by movement of the calming band 80 towards the cradle 70. As a result, the distance between the interior of the calming band 80 and the cradle 70 decreases as the cam radius defined by peripheral edge 31 of cam 30 increases. Decreasing the distance between the calming band 80 and the cradle 70 provides additional compression to a hatchling located within the hatchling support 50.

That additional compression may, in one or more embodiments, assist in preventing or reducing unwanted movement of a hatchling during processing. For example, movement of the torso of a hatchling during the beak treatment process may be less of a concern because the beak of a hatchling having its head restrained in the head cavity 62 of head holder 60 will be unlikely to move due to movement of the torso of a hatchling contained in the hatchling support 50.

Unwanted movement of the torso of a hatchling during an injection process may, however, be problematic when an injection needle 27 of injection stations 26 is advanced to deliver a composition to the hatchling as part of the injection process. As a result, it may be particularly beneficial to provide additional compression to the torso of a hatchling located in hatchling support 50 during an injection process (or other process performed on the torso of a hatchling). Moreover, the additional compression may serve to calm the hatchlings as described herein resulting in less movement of the hatchling torso merely because the hatchlings are calmer as a result of the increased compression.

Although not specifically discussed herein, it will be understood that the various components of the hatchling supports and hatchling support systems described herein may be made of any suitable material or combination of materials including, for example, polymers, metal, ceramic, wood, etc.

ILLUSTRATIVE ASPECTS

Following are some aspects of the hatchling supports, hatchling support systems and methods described herein.

According to a first independent aspect of the invention, a hatchling support is provided that includes: a head holder comprising a head cavity configured to receive a head of a hatchling and a keeper apparatus configured to retain a head of a hatchling in the head cavity, the keeper apparatus optionally movable between an open configuration and a closed configuration, wherein the head of a hatchling is retained in the head cavity when the keeper apparatus is in the closed configuration and wherein a head of a hatchling in the head cavity is free to move out of the head cavity when the keeper apparatus is in the open configuration; a cradle operably attached to the head holder, wherein the cradle is movable between a loading configuration and a support configuration, wherein, optionally, the cradle rotates about a cradle axis oriented transverse to a midline of a hatchling having a head retained in the head cavity of the head holder when moving between the loading configuration and the support configuration, wherein the cradle supports a ventral surface of a hatchling having a head retained in the head cavity of the head holder when the cradle is in the support configuration; and a calming band operably attached to the head holder, wherein the calming band is movable between a retracted configuration and an activated configuration, wherein, optionally, the calming band rotates about a band axis oriented transverse to a midline of a hatchling having a head retained in the head cavity of the head holder when moving between the retracted configuration and the activated configuration, wherein the calming band is positioned proximate a dorsal surface of a torso of a hatchling having a head retained in the head cavity of the head holder and a ventral surface supported by the cradle when the cradle is in the support configuration.

In a 2$^{nd}$ aspect according to aspect 1, the cradle extends from a cranial end proximate the cradle axis to a seat end distal from the cradle axis, wherein the seat end comprises a cupped segment configured to extend between the legs of a hatchling having a ventral surface supported by the cradle when the cradle is in the support configuration. This feature provides additional support to the hatchling, improving its retention in the hatchling support and, by increasing the support, also serves to further calm the hatchling during processing. In a 3$^{rd}$ aspect according to aspect 2, the cupped segment comprises a forked configuration comprising a vent slot extending towards the cranial end of the cradle. The vent slot reduces the likelihood that waste products from the hatchlings are retained on the cradle.

In a 4$^{th}$ aspect according to aspect 1, the cradle extends from a cranial end proximate the cradle axis to a seat end distal from the cradle axis, wherein the seat end comprises a vent slot extending from the seat end dorsal surface towards the cranial end. The vent slot reduces the likelihood that waste products from the hatchlings are retained on the cradle.

In a 5$^{th}$ aspect according to any one of aspects 2 or 3, the seat end is configured to fit between the legs of a hatchling having a ventral surface supported by the cradle when the cradle is in the support configuration. This feature also provides additional support to the hatchling, improving its retention in the hatchling support and, by increasing the support, also serves to further calm the hatchling during processing.

In a $6^{th}$ aspect according to any one of the preceding aspects, the calming band comprises a left arm and a right arm, wherein the left arm and the right arm are located on opposite sides of a midline of a hatchling having a head retained in the head cavity of the head holder and a ventral surface supported by the cradle when the cradle is in the support configuration, wherein the left arm and the right arm each comprise a base end, wherein the band axis extends through the base end of each of the left arm and the right arm. This feature also provides additional support to the hatchling by improving rigidity of the calming band, improving its retention in the hatchling support and, by increasing the support, also serves to further calm the hatchling during processing.

In a $7^{th}$ aspect according to aspect 6, the calming band comprises a dorsal surface segment extending from one or both of the left arm and the right arm.

In an $8^{th}$ aspect according to aspect 6, the calming band comprises a continuous dorsal surface segment extending continuously between the left arm and the right arm. This feature also provides additional support to the hatchling by improving rigidity of the calming band, improving its retention in the hatchling support and, by increasing the support, also serves to further calm the hatchling during processing.

In a $9^{th}$ aspect according to aspects 7 or 8, the dorsal surface segment comprises a top edge proximate the head cavity and a bottom edge distal from the head cavity when the calming band is in the activated configuration, wherein the dorsal surface segment has a height measured between the top edge and the bottom edge along a midline of a hatchling having a head retained in the head cavity of the head holder and a ventral surface supported by the cradle when the cradle is in the support configuration, wherein, optionally, the height of the dorsal surface segment is 1 centimeter or more and, optionally, 3 centimeters or less.

In a $10^{th}$ aspect according to any one of aspects 1-5, the calming band comprises a hoop extending between a left end and a right end, wherein the band axis extends through the left end and the right end such that the hoop rotates about the band axis. This feature also provides additional support to the hatchling by improving rigidity of the calming band, improving its retention in the hatchling support and, by increasing the support, also serves to further calm the hatchling during processing.

In an $11^{th}$ aspect according to aspect 10, the hoop comprises a top edge proximate the head cavity and a bottom edge distal from the head cavity when the calming band is in the activated configuration, wherein the hoop has a height measured between the top edge and the bottom edge along a midline of a hatchling having a head retained in the head cavity of the head holder and a ventral surface supported by the cradle when the cradle is in the support configuration, wherein, optionally, the height of the hoop is 1 centimeter or more and, optionally, 3 centimeters or less.

In a $12^{th}$ aspect according to any one of the preceding aspects, the cradle comprises a cradle gear and the calming band comprises a band gear, wherein the cradle gear rotates about the cradle axis and wherein the band gear rotates about the band axis, and further wherein the cradle gear meshes with the band gear such that rotation of the cradle gear about the cradle axis rotates the band gear about the band axis.

In a $13^{th}$ aspect according to any one of aspects 1 to 12, wherein the cradle axis is aligned with the band axis.

According to a $14^{th}$ independent aspect of the invention, a method of supporting a hatchling using the hatchling support of any one of aspects 1 to 13 includes: placing a head of a hatchling in the head cavity of the head holder and retaining the head of the hatchling in the head cavity by moving the keeper apparatus to the closed configuration; supporting a ventral surface of the hatchling on the cradle by rotating the cradle to the support configuration from the loading configuration after retaining the head of the hatchling in the head cavity; and positioning the calming band on the dorsal surface of the hatchling by rotating the calming band from the retracted configuration to the activated configuration about the band axis after retaining the head of the hatchling in the head cavity.

In a $15^{th}$ aspect according to aspect 14, the method comprises rotating the calming band about the band axis while rotating the cradle about the cradle axis.

According to a $16^{th}$ independent aspect of the invention, a method of supporting a hatchling includes: restraining a head of a hatchling in a head cavity of a head holder; supporting a ventral surface of the hatchling on a cradle by rotating the cradle into contact with the ventral surface of the hatchling after restraining the head of the hatchling in the head cavity of the head holder; and moving a calming band into contact with the dorsal surface of the hatchling by rotating the calming band into contact with the dorsal surface of the hatchling after restraining the head of the hatchling in the head cavity.

In a $17^{th}$ aspect according to aspect 16, the method comprises rotating the calming band while rotating the cradle.

In an $18^{th}$ aspect according to any one of the aspects 16 to 17, wherein rotating the cradle causes the calming band to rotate into contact with the dorsal surface of the hatchling.

In a $19^{th}$ aspect according to any one of aspects 16 to 18, the method comprises rotating the cradle out of contact with the ventral surface of the hatchling after moving the calming band into contact with the dorsal surface of the hatchling, wherein rotating the cradle out of contact with the ventral surface of the hatchling causes the calming band to rotate out of contact with the dorsal surface of the hatchling.

In a $20^{th}$ aspect according to any one of aspects 16 to 19, after rotating the cradle into contact with the ventral surface of the hatchling and rotating the calming band into contact with the dorsal surface of the hatchling, further rotation of the cradle towards the ventral surface of the hatchling causes further rotation of the calming band towards the dorsal surface of the hatchling.

According to a $21^{st}$ independent aspect of the invention, a hatchling support system is provided that includes: a support platform mounted on a base for rotation about a platform axis extending through the support platform and the base; a cam comprising a peripheral edge, wherein a rotational position of the cam is, optionally, fixed relative to the platform axis, wherein the peripheral edge of the cam comprises a plurality of cam sections, wherein each cam section of the plurality of cam sections occupies a selected arc of the peripheral edge, and wherein a cam radius between the platform axis and the peripheral edge in each cam section of the plurality of cam sections is different; and a plurality of hatchling supports mounted on a periphery of the support platform, wherein each hatchling support is mounted in a fixed location on the periphery of the support platform, and wherein rotation of the support platform about the platform axis rotates the plurality of hatchling supports about the platform axis and the cam, wherein each hatchling support of the plurality of hatchling supports comprises: an open configuration and a closed configuration, wherein the hatchling support is configured to receive a hatchling in the open configuration and retain a hatchling in the closed configuration, a follower configured to contact the peripheral edge of the cam in one or more cam sections of the plurality of cam sections, wherein the follower is in an open position when the hatchling support is in the open configuration and a closed position when the hatchling support is in the closed configuration, wherein contact between the follower and the peripheral edge of the cam is configured to hold the follower in the closed position in at least one cam section of the plurality of cam sections.

In a 22$^{nd}$ aspect according to aspect 21, the follower of each hatchling support of the plurality of hatchling supports is biased to move to the open position from the closed position.

In a 23$^{rd}$ aspect according to aspect 21, the follower of each hatchling support of the plurality of hatchling supports is biased to move to the open position from the closed position when the hatchling support is in a cam section of the plurality of cam sections in which the follower is spaced apart from the peripheral edge of the cam.

In a 24$^{th}$ aspect according to any one of aspects 21 to 23, the plurality of cam sections comprises a first cam section, wherein the follower on each hatchling support of the plurality of hatchling supports is in the open position in the first cam section, and wherein the at least one cam section of the plurality cam sections in which contact between the follower of each hatchling support of the plurality of hatchling supports and the peripheral edge of the cam is configured to hold the follower of each hatchling support of the plurality of hatchling supports in the closed position comprises a second cam section of the plurality of cam sections.

In a 25$^{th}$ aspect according to aspect 24, the cam radius between the platform axis and the peripheral edge in the second cam section is greater than the cam radius between the platform axis and the peripheral edge in the first cam section.

In a 26$^{th}$ aspect according to any one of aspects 21 to 23, plurality of cam sections comprises a first cam section, a second cam section, and a third cam section; wherein the follower of each hatchling support of the plurality of hatchling supports is in the open position in the first cam section; wherein the second cam section comprises the at least one cam section of the plurality cam sections in which contact between the follower and the peripheral edge of the cam of each hatchling support of the plurality of hatchling supports is configured to hold the follower in the closed position; wherein contact between the follower and the peripheral edge of the cam in the third cam section is configured to hold the follower of each hatchling support of the plurality of hatchling supports in the closed position; wherein the second cam section is located between first cam section and the third cam section; and wherein the cam radius between the platform axis and the peripheral edge in the third cam section is greater than the cam radius between the platform axis and the peripheral edge in the second cam section. This feature improves operation of the system by providing different levels of compression to retain the hatchlings more firmly where needed and less firmly when not needed.

In a 27$^{th}$ aspect according to aspect 26, the cam radius between the platform axis and the peripheral edge in the second cam section is greater than the cam radius between the platform axis and the peripheral edge in the first cam section.

In a 28$^{th}$ aspect according to any one of aspects 26 to 27, the plurality of cam sections comprises a fourth cam section in which contact between the follower of each hatchling support of the plurality of hatchling supports and the peripheral edge of the cam is configured to allow the follower of each hatchling support of the plurality of hatchling supports to move to the open position, wherein the third cam section is located between the second cam section and the fourth cam section.

In a 29$^{th}$ aspect according to aspect 28, the cam radius between the platform axis and the peripheral edge in the fourth cam section is greater than the cam radius between the platform axis and the peripheral edge in the first cam section.

In a 30$^{th}$ aspect according to any one of aspects 28 to 29, the system comprises a first set of processing stations, wherein each processing station of the plurality of processing stations is positioned at a fixed location relative to the second cam section.

In a 31$^{st}$ aspect according to any one of aspects 28 to 29, the system comprises: a first set of processing stations, wherein each processing station of the first set of processing stations is positioned at a fixed location relative to the second cam section; and a second set of processing stations, wherein each processing station of the second set of processing stations is positioned at a fixed location relative to the third cam section.

In a 32$^{nd}$ aspect according to aspect 31, each processing station of the first set of processing stations is configured to perform a first process on a hatchling located in one hatchling support of the plurality of hatchling supports, and wherein each processing station of the second set of processing stations is configured to perform a second process on a hatchling located in one hatchling support of the plurality of hatchling supports.

In a 33$^{rd}$ aspect according to aspect 32, the first process and the second process are different.

In a 34$^{th}$ aspect according to any one of aspects 31 to 33, the first set of processing stations comprises a set of beak treatment stations.

In a 35$^{th}$ aspect according to any one of aspects 31 to 34, the second set of processing stations comprises a set of injection stations.

In a 36$^{th}$ aspect according to any one of aspects 21 to 35, the first set of processing stations is attached to a process station platform, wherein the rotational position of the process station platform is fixed relative to the platform axis.

In a 37$^{th}$ aspect according to any one of aspects 21 to 36, each hatchling support of the plurality of hatchling supports comprises a head holder, a cradle, and a calming band, wherein the cradle comprises the follower of each hatchling support of the plurality of hatchling supports; wherein the head holder of each hatchling support of the plurality of hatchling supports comprises a head cavity configured to receive a head of a hatchling, the head holder comprising a keeper apparatus configured to retain a head of a hatchling in the head cavity, the keeper apparatus movable between an open configuration and a closed configuration, wherein the head of a hatchling is retained in the head cavity when the keeper apparatus is in the closed configuration and wherein a head of a hatchling in the head cavity is free to move out of the head cavity when the keeper apparatus is in the open configuration; wherein the cradle of each hatchling support of the plurality of hatchling supports is operably attached to the head holder, wherein the cradle is movable between a loading configuration and a support configuration, wherein the cradle rotates about a cradle axis oriented transverse to a midline of a hatchling having a head retained in the head cavity of the head holder when moving between the loading configuration and the support configuration, wherein the cradle supports a ventral surface of a hatchling having a head retained in the head cavity of the head holder when the cradle is in the support configuration; and wherein the calming band of each hatchling support of the plurality of hatchling supports is operably attached to the head holder, wherein the calming band is movable between a retracted configuration and an activated configuration, wherein the calming band rotates about a band axis oriented transverse to a midline of a hatchling having a head retained in the head cavity of the head holder when moving between the retracted configuration and the activated configuration, wherein the calming band is positioned proximate a dorsal surface of a torso of a hatchling having a head retained in the head cavity of the head holder and a ventral surface supported by the cradle when the cradle is in the support configuration.

In a 38$^{th}$ aspect according to aspect 37, the cradle extends from a cranial end proximate the cradle axis to a seat end distal from the cradle axis, wherein the seat end comprises a cupped segment configured to extend between the legs of a hatchling having a ventral surface supported by the cradle when the cradle is in the support configuration. This feature provides additional support to the hatchling, improving its retention in the hatchling support and, by increasing the support, also serves to further calm the hatchling during processing.

In a 39$^{th}$ aspect according to aspect 38, the cupped segment comprises a forked configuration comprising a vent slot extending towards the cranial end of the cradle. The vent slot reduces the likelihood that waste products from the hatchlings are retained on the cradle.

In a 40$^{th}$ aspect according to aspect 37, the cradle extends from a cranial end proximate the cradle axis to a seat end distal from the cradle axis, wherein the seat end comprises a vent slot extending from the seat end dorsal surface towards the cranial end. The vent slot reduces the likelihood that waste products from the hatchlings are retained on the cradle.

In a 41$^{st}$ aspect according to any one of aspects 38 to 40, the seat end is configured to fit between the legs of a hatchling having a ventral surface supported by the cradle when the cradle is in the support configuration. This feature also provides additional support to the hatchling, improving its retention in the hatchling support and, by increasing the support, also serves to further calm the hatchling during processing.

In a 42$^{nd}$ aspect according to any one of aspects 37 to 41, the calming band comprises a left arm and a right arm, wherein the left arm and the right arm are located on opposite sides of a midline of a hatchling having a head retained in the head cavity of the head holder and a ventral surface supported by the cradle when the cradle is in the support configuration, wherein the left arm and the right arm each comprise a base end, wherein the band axis extends through the base end of each of the left arm and the right arm. This feature also provides additional support to the hatchling by improving rigidity of the calming band, improving its retention in the hatchling support and, by increasing the support, also serves to further calm the hatchling during processing.

In a 43$^{rd}$ aspect according to aspect 42, the calming band comprises a dorsal surface segment extending from one or both of the left arm and the right arm.

In a 44$^{th}$ aspect according to aspect 42, the calming band comprises a continuous dorsal surface segment extending continuously between the left arm and the right arm.

This feature also provides additional support to the hatchling by improving rigidity of the calming band, improving its retention in the hatchling support and, by increasing the support, also serves to further calm the hatchling during processing.

In a 45$^{th}$ aspect according to any one of aspects 43 to 44, the dorsal surface segment comprises a top edge proximate the head cavity and a bottom edge distal from the head cavity when the calming band is in the activated configuration, wherein the dorsal surface segment has a height measured between the top edge and the bottom edge along a midline of a hatchling having a head retained in the head cavity of the head holder and a ventral surface supported by the cradle when the cradle is in the support configuration, wherein, optionally, the height of the dorsal surface segment is 1 centimeter or more.

In a 46$^{th}$ aspect according to any one of aspects 37 to 41, the calming band comprises a hoop extending between a left end and a right end, wherein the band axis extends through the left end and the right end such that the hoop rotates about the band axis. This feature also provides additional support to the hatchling by improving rigidity of the calming band, improving its retention in the hatchling support and, by increasing the support, also serves to further calm the hatchling during processing.

In a 47$^{th}$ aspect according to aspect 46, the hoop comprises a top edge proximate the head cavity and a bottom edge distal from the head cavity when the calming band is in the activated configuration, wherein the hoop has a height measured between the top edge and the bottom edge along a midline of a hatchling having a head retained in the head cavity of the head holder and a ventral surface supported by the cradle when the cradle is in the support configuration, wherein, optionally, the height of the hoop is 1 centimeter or more and, optionally, 3 centimeters or less.

In a 48$^{th}$ aspect according to any one of aspects 37 to 47, the cradle comprises a cradle gear and the calming band comprises a band gear, wherein the cradle gear rotates about the cradle axis and wherein the band gear rotates about the band axis, and further wherein the cradle gear meshes with the band gear such that rotation of the cradle gear about the cradle axis rotates the band gear about the band axis.

In a 49$^{th}$ aspect according to any one of aspects 37 to 48, the cradle axis is aligned with the band axis.

According to a 50$^{th}$ independent aspect of the invention, a method of supporting and transporting hatchlings includes: restraining a head of a hatchling in a head cavity of a head holder; supporting a ventral surface of the hatchling on a cradle by rotating the cradle into contact with the ventral surface of the hatchling after restraining the head of the hatchling in the head cavity of the head holder; moving a calming band into contact with the dorsal surface of the hatchling by rotating the calming band into contact with the dorsal surface of the hatchling after restraining the head of the hatchling in the head cavity, wherein the head holder, the cradle, and the calming band are operably attached to form a hatchling support; and wherein rotating the cradle into contact with the ventral surface of the hatchling comprises rotating the hatchling support about a platform axis to contact the cradle with a first segment of a cam configured to rotate the cradle about a cradle axis as the hatchling support rotates about the platform axis.

In a 51st aspect according to aspect 50, the hatchling support comprises a hatchling support of any one of aspects 1 to 13.

In a 52nd aspect according to any one of aspects 51 to 52, the hatchling support comprises one hatchling support of the plurality of hatchling supports of any one of aspects 21 to 29.

In a 53rd aspect according to any one of aspects 50 to 52, the method comprises rotating the calming band while rotating the cradle.

In a 54th aspect according to any one of aspects 50 to 53, rotating the cradle causes the calming band to rotate into contact with the dorsal surface of the hatchling.

In a 55th aspect according to any one of aspects 50 to 54, the method comprises rotating the cradle out of contact with the ventral surface of the hatchling after moving the calming band into contact with the dorsal surface of the hatchling, wherein rotating the cradle out of contact with the ventral surface of the hatchling comprises further rotation of the hatchling support about the platform axis to a successive segment of the cam having a cam radius smaller than a cam radius of the first segment of the cam.

In a 56th aspect according to aspect 55, rotating the cradle out of contact with the ventral surface of the hatchling causes the calming band to rotate out of contact with the dorsal surface of the hatchling.

In a 57th aspect according to any one of aspects 50 to 56, after rotating the cradle into contact with the ventral surface of the hatchling and rotating the calming band into contact with the dorsal surface of the hatchling, further rotation of the cradle towards the ventral surface of the hatchling causes further rotation of the calming band towards the dorsal surface of the hatchling, wherein further rotation of the cradle is caused by further rotation of the hatchling support about the platform axis such that the cradle contacts a second segment of the cam comprising a cam radius measured from the platform axis that is greater than a cam radius in the first segment of the cam.

In a 58th aspect according to any one of aspects 50 to 57, after rotating the cradle into contact with the ventral surface of the hatchling and rotating the calming band into contact with the dorsal surface of the hatchling, further rotation of the hatchling support about the platform axis moves such that the cradle contacts a second segment of the cam comprising a cam radius measured from the platform axis that is greater than a cam radius in the first segment of the cam. This feature improves the method by providing different levels of compression to retain the hatchlings more firmly where needed and less firmly when not needed.

All references and publications cited herein are expressly incorporated herein by reference in their entirety into this disclosure, except to the extent they may directly contradict this disclosure. Although specific illustrative embodiments have been described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims.

What is claimed is:

1. A hatchling support comprising:

a head holder comprising a head cavity configured to receive a head of a hatchling and a keeper apparatus configured to retain a head of a hatchling in the head cavity, the keeper apparatus movable between an open configuration and a closed configuration, wherein the head of a hatchling is retained in the head cavity when the keeper apparatus is in the closed configuration and wherein a head of a hatchling in the head cavity is free to move out of the head cavity when the keeper apparatus is in the open configuration;

a cradle operably attached to the head holder, wherein the cradle is movable between a loading configuration and a support configuration, wherein the cradle is configured to rotate relative to the head holder about a cradle axis oriented transverse to a midline of a hatchling having a head retained in the head cavity of the head holder when moving between the loading configuration and the support configuration, wherein the cradle supports a ventral surface of a hatchling having a head retained in the head cavity of the head holder when the cradle is in the support configuration; and a calming band operably attached to the head holder, wherein the calming band is movable between a retracted configuration and an activated configuration, wherein the calming band rotates about a calming band axis oriented transverse to a midline of a hatchling having a head retained in the head cavity of the head holder when moving between the retracted configuration and the activated configuration, wherein the calming band is positioned proximate a dorsal surface of a torso of a hatchling having a head retained in the head cavity of the head holder and a ventral surface supported by the cradle when the cradle is in the support configuration, wherein the cradle comprises a cradle gear and the calming band comprises a band gear and wherein the cradle gear rotates about the cradle axis and wherein the band gear rotates about the calming band axis, and further wherein the cradle gear meshes with the band gear such that rotation of the cradle gear about the cradle axis rotates the band gear about the calming band axis and wherein the cradle axis is aligned with the calming band axis.

2. A hatchling support according to claim 1, wherein the cradle extends from a cranial end proximate the cradle axis to a seat end distal from the cradle axis, wherein the seat end comprises a cupped segment configured to extend between the legs of a hatchling having a ventral surface supported by the cradle when the cradle is in the support configuration.

3. A hatchling according to claim 2, wherein the cupped segment comprises a forked configuration comprising a vent slot extending towards the cranial end of the cradle.

4. A hatchling support according to claim 2, wherein the seat end is configured to fit between the legs of a hatchling having a ventral surface supported by the cradle when the cradle is in the support configuration.

5. A hatchling support according to claim 1, wherein the cradle extends from a cranial end proximate the cradle axis to a seat end distal from the cradle axis, wherein the seat end comprises a vent slot extending from the seat end dorsal surface towards the cranial end.

6. A hatchling support according to claim 1, wherein the calming band comprises a left arm and a right arm, wherein the left arm and the right arm are located on opposite sides of a midline of a hatchling having a head retained in the head cavity of the head holder and a ventral surface supported by the cradle when the cradle is in the support configuration, wherein the left arm and the right arm each comprise a base end, wherein the band axis extends through the base end of each of the left arm and the right arm.

7. A hatchling support according to claim 6, wherein the calming band comprises a continuous dorsal surface segment extending continuously between the left arm and the right arm.

8. A hatchling support according to claim 6, wherein the calming band comprises a dorsal surface segment extending from one or both of the left arm and the right arm.

9. A hatchling support according to claim 8, wherein the dorsal surface segment comprises a top edge proximate the head cavity and a bottom edge distal from the head cavity when the calming band is in the activated configuration, wherein the dorsal surface segment has a height measured between the top edge and the bottom edge along a midline of a hatchling having a head retained in the head cavity of the head holder and a ventral surface supported by the cradle when the cradle is in the support configuration, wherein, the height of the dorsal surface segment is 3 centimeters or less.

10. A hatchling support according to claim 1, wherein the calming band comprises a hoop extending between a left end and a right end, wherein the band axis extends through the left end and the right end such that the hoop rotates about the band axis.

11. A hatchling support according to claim 10, wherein the hoop comprises a top edge proximate the head cavity and a bottom edge distal from the head cavity when the calming band is in the activated configuration, wherein the hoop has a height measured between the top edge and the bottom edge along a midline of a hatchling having a head retained in the head cavity of the head holder and a ventral surface supported by the cradle when the cradle is in the support configuration, wherein the height of the hoop is 3 centimeters or less.

12. A method of supporting a hatchling using the hatchling support of claim 1, wherein the method comprises:

placing a head of a hatchling in the head cavity of the head holder and retaining the head of the hatchling in the head cavity by moving the keeper apparatus to the closed configuration;

supporting a ventral surface of the hatchling on the cradle by rotating the cradle to the support configuration from the loading configuration after retaining the head of the hatchling in the head cavity; and positioning the calming band on the dorsal surface of the hatchling by rotating the calming band from the retracted configuration to the activated configuration about the band axis after retaining the head of the hatchling in the head cavity.

13. A method according to claim 12, wherein the method comprises rotating the calming band about the band axis while rotating the cradle about the cradle axis.

14. A method of supporting a hatchling, the method comprising:

restraining a head of a hatchling in a head cavity of a head holder;

supporting a ventral surface of the hatchling on a cradle comprising a cradle gear by rotating the cradle about a cradle axis into contact with the ventral surface of the hatchling after restraining the head of the hatchling in the head cavity of the head holder; and moving a calming band comprising a band gear into contact with the dorsal surface of the hatchling by rotating the calming band about a band axis into contact with the dorsal surface of the hatchling after restraining the head of the hatchling in the head cavity, wherein the cradle gear meshes with the band gear such that rotation of the cradle gear about the cradle axis rotates the band gear about the band axis.

15. A method according to claim 14, wherein the method comprises rotating the calming band while rotating the cradle.

16. A method according to claim 14, wherein rotating the cradle causes the calming band to rotate into contact with the dorsal surface of the hatchling.

17. A method according to claim 14, wherein the method comprises rotating the cradle out of contact with the ventral surface of the hatchling after moving the calming band into contact with the dorsal surface of the hatchling, wherein rotating the cradle out of contact with the ventral surface of the hatchling causes the calming band to rotate out of contact with the dorsal surface of the hatchling.

18. A method according to claim 14, wherein, after rotating the cradle into contact with the ventral surface of the hatchling and rotating the calming band into contact with the dorsal surface of the hatchling, further rotation of the cradle towards the ventral surface of the hatchling causes further rotation of the calming band towards the dorsal surface of the hatchling.

19. A method according to claim 14, wherein rotating the cradle into contact with the ventral surface of the hatchling comprises rotating the cradle relative to the head holder.

20. A hatchling support comprising:

a head holder comprising a head cavity configured to receive a head of a hatchling and a keeper apparatus configured to retain a head of a hatchling in the head cavity, the keeper apparatus movable between an open configuration and a closed configuration, wherein the head of a hatchling is retained in the head cavity when the keeper apparatus is in the closed configuration and wherein a head of a hatchling in the head cavity is free to move out of the head cavity when the keeper apparatus is in the open configuration;

a cradle operably attached to the head holder, wherein the cradle is movable between a loading configuration and a support configuration, wherein the cradle rotates about a cradle axis oriented transverse to a midline of a hatchling having a head retained in the head cavity of the head holder when moving between the loading configuration and the support configuration, wherein the cradle supports a ventral surface of a hatchling having a head retained in the head cavity of the head holder when the cradle is in the support configuration; and a calming band operably attached to the head holder, wherein the calming band is movable between a retracted configuration and an activated configuration, wherein the calming band rotates about a band axis oriented transverse to a midline of a hatchling having a head retained in the head cavity of the head holder when moving between the retracted configuration and the activated configuration, wherein the calming band is positioned proximate a dorsal surface of a torso of a hatchling having a head retained in the head cavity of the head holder and a ventral surface supported by the cradle when the cradle is in the support configuration;

wherein the cradle comprises a cradle gear and the calming band comprises a band gear, wherein the cradle gear rotates about the cradle axis and wherein the band gear rotates about the band axis, and further wherein the cradle gear meshes with the band gear such that rotation of the cradle gear about the cradle axis rotates the band gear about the band axis.

21. A hatchling support according to claim 20, wherein the calming band comprises a left arm and a right arm, wherein the left arm and the right arm are located on opposite sides of a midline of a hatchling having a head retained in the head cavity of the head holder and a ventral surface supported by the cradle when the cradle is in the support configuration, wherein the left arm and the right arm each comprise a base end, wherein the band axis extends through the base end of each of the left arm and the right arm.

22. A hatchling support according to claim 21, wherein the calming band comprises a dorsal surface segment extending from one or both of the left arm and the right arm.

23. A hatchling support according to claim 21, wherein the calming band comprises a continuous dorsal surface segment extending continuously between the left arm and the right arm.

24. A hatchling support according to claim 20, wherein the calming band comprises a hoop extending between a left end and a right end, wherein the band axis extends through the left end and the right end such that the hoop rotates about the band axis.

25. A method of supporting a hatchling, the method comprising:

restraining a head of a hatchling in a head cavity of a head holder;

supporting a ventral surface of the hatchling on a cradle by rotating the cradle into contact with the ventral surface of the hatchling after restraining the head of the hatchling in the head cavity of the head holder; and moving a calming band into contact with the dorsal surface of the hatchling by rotating the calming band into contact with the dorsal surface of the hatchling after restraining the head of the hatchling in the head cavity, wherein the method comprises rotating the cradle out of contact with the ventral surface of the hatchling after moving the calming band into contact with the dorsal surface of the hatchling, wherein rotating the cradle out of contact with the ventral surface of the hatchling causes the calming band to rotate out of contact with the dorsal surface of the hatchling.

26. The method of claim 25, wherein the method comprises rotating the calming band while rotating the cradle.

27. The method of claim 25, wherein rotating the cradle causes the calming band to rotate into contact with the dorsal surface of the hatchling.

28. The method of claim 25, wherein rotating the cradle into contact with the ventral surface of the hatchling comprises rotating the cradle relative to the head holder.

29. The method of claim 25, wherein, after rotating the cradle into contact with the ventral surface of the hatchling and rotating the calming band into contact with the dorsal surface of the hatchling, further rotation of the cradle towards the ventral surface of the hatchling causes further rotation of the calming band towards the dorsal surface of the hatchling.

30. A method of supporting a hatchling, the method comprising:

restraining a head of a hatchling in a head cavity of a head holder;

supporting a ventral surface of the hatchling on a cradle by rotating the cradle into contact with the ventral surface of the hatchling after restraining the head of the hatchling in the head cavity of the head holder; and moving a calming band into contact with the dorsal surface of the hatchling by rotating the calming band into contact with the dorsal surface of the hatchling after restraining the head of the hatchling in the head cavity, wherein, after rotating the cradle into contact with the ventral surface of the hatchling and rotating the calming band into contact with the dorsal surface of the hatchling, further rotation of the cradle towards the ventral surface of the hatchling causes further rotation of the calming band towards the dorsal surface of the hatchling.

31. The method of claim 30, wherein the method comprises rotating the calming band while rotating the cradle.

32. The method of claim 30, wherein rotating the cradle causes the calming band to rotate into contact with the dorsal surface of the hatchling.

33. The method of claim 30, wherein rotating the cradle into contact with the ventral surface of the hatchling comprises rotating the cradle relative to the head holder.

34. The method of claim 30, wherein the method comprises rotating the cradle out of contact with the ventral surface of the hatchling after moving the calming band into contact with the dorsal surface of the hatchling, wherein rotating the cradle out of contact with the ventral surface of the hatchling causes the calming band to rotate out of contact with the dorsal surface of the hatchling.

* * * * *